United States Patent
Wang

(10) Patent No.: US 10,205,555 B2
(45) Date of Patent: Feb. 12, 2019

(54) DOWNLINK MULTIPLE ACCESS METHOD, BASE STATION, AND TERMINAL

(71) Applicant: Huawei Technologies Co., Ltd., Shenzhen (CN)

(72) Inventor: Xuesong Wang, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 72 days.

(21) Appl. No.: 15/377,062

(22) Filed: Dec. 13, 2016

(65) Prior Publication Data

US 2017/0093523 A1     Mar. 30, 2017

Related U.S. Application Data

(63) Continuation of application No. PCT/CN2014/079868, filed on Jun. 13, 2014.

(51) Int. Cl.
| | |
|---|---|
| H04L 1/00 | (2006.01) |
| H04L 5/00 | (2006.01) |
| H04J 11/00 | (2006.01) |

(52) U.S. Cl.
CPC .......... *H04L 1/0009* (2013.01); *H04J 11/003* (2013.01); *H04J 11/005* (2013.01);
(Continued)

(58) Field of Classification Search
CPC .... H04L 1/0089; H04L 1/0002; H04L 5/0073
See application file for complete search history.

(56) References Cited

U.S. PATENT DOCUMENTS

| | | | |
|---|---|---|---|
| 6,680,987 B1 * | 1/2004 | Beidas | H04L 25/0232 375/142 |
| 6,788,963 B2 | 9/2004 | Laroia et al. | |

(Continued)

FOREIGN PATENT DOCUMENTS

| | | |
|---|---|---|
| CN | 1778121 A | 5/2006 |
| CN | 102907050 A | 1/2013 |

(Continued)

OTHER PUBLICATIONS

Goldsmith, A.J., "The Capacity of Downlink Fading Channels with Variable Rate and Power," IEEE Transactions on Vehicular Technology, vol. 46, No. 3, Aug. 1997, pp. 569-580.

(Continued)

*Primary Examiner* — Rasheed Gidado
(74) *Attorney, Agent, or Firm* — Slater Matsil, LLP

(57) ABSTRACT

A method and devices are provided. The method includes transmitting, by a first base station, a superposition of a codeword of first information and a codeword of second information to N terminals, where the first information and the second information correspond to each terminal of the N terminals, and N is a positive integer; and a codeword of first information corresponding to the $r^{th}$ terminal is obtained according to a transmit rate and a transmit power for the codeword of the first information corresponding to the $r^{th}$ terminal, a codeword of second information corresponding to the $r^{th}$ terminal is obtained according to a transmit rate and a transmit power for the codeword of the second information corresponding to the $r^{th}$ terminal, the transmit rate for the codeword of the first information corresponding to the $r^{th}$ terminal meets a first condition.

10 Claims, 7 Drawing Sheets

(52) U.S. Cl.
CPC ....... *H04J 11/0026* (2013.01); *H04J 11/0046* (2013.01); *H04L 1/0002* (2013.01); *H04L 5/00* (2013.01); *H04L 5/0073* (2013.01)

(56) References Cited

U.S. PATENT DOCUMENTS

| | | | |
|---|---|---|---|
| 7,787,573 B2* | 8/2010 | Kim | H04L 1/0643 375/260 |
| 9,918,312 B2* | 3/2018 | Kuchibhotla | H04W 72/0446 |
| 2004/0166869 A1* | 8/2004 | Laroia | H04L 1/1607 455/450 |
| 2009/0017762 A1* | 1/2009 | Jovicic | H04W 72/082 455/63.1 |
| 2011/0200144 A1* | 8/2011 | Adler | H04B 7/0894 375/316 |
| 2013/0225179 A1* | 8/2013 | Jul | H04W 16/16 455/438 |
| 2014/0056280 A1* | 2/2014 | Chen | H04L 5/0023 370/330 |
| 2014/0133494 A1 | 5/2014 | Liang et al. | |

FOREIGN PATENT DOCUMENTS

| | | |
|---|---|---|
| WO | 03107546 A1 | 12/2003 |
| WO | 2013159207 A1 | 10/2013 |

OTHER PUBLICATIONS

Seong, K., et al., "Optimal Resource Allocation via Geometric Programming for OFDM Broadcast and Multiple Access Channels," IEEE Globecom 2006 proceedings, 6 pages.

* cited by examiner

A first base station transmits a superposition of a codeword of first information and a codeword of second information to N terminals, where the first information and the second information are corresponding to each terminal of the N terminals, and N is a positive integer; and a codeword of first information corresponding to the $r^{th}$ terminal is obtained according to a transmit rate and a transmit power for the codeword of the first information corresponding to the $r^{th}$ terminal, a codeword of second information corresponding to the $r^{th}$ terminal is obtained according to a transmit rate and a transmit power for the codeword of the second information corresponding to the $r^{th}$ terminal, the transmit rate for the codeword of the first information corresponding to the $r^{th}$ terminal meets a first condition, and the transmit rate for the codeword of the second information corresponding to the $r^{th}$ terminal meets a second condition, where the first condition is: when codewords of second information corresponding to the N terminals are regarded as noise, the first information corresponding to the $r^{th}$ terminal is capable of being decoded correctly at any terminal of the N terminals; the second condition is: when codewords of second information corresponding to the other (N−1) terminals are regarded as noise, the second information corresponding to the $r^{th}$ terminal is capable of being decoded correctly at the $r^{th}$ terminal; and $1 \leq r \leq N$

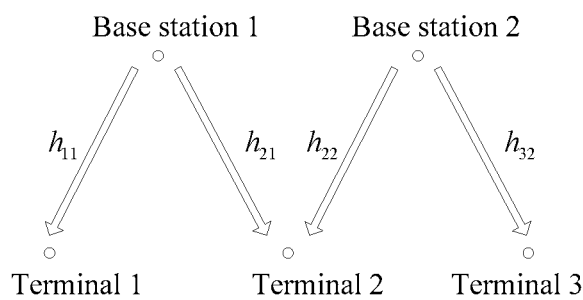

FIG. 4

If a first base station in a neighboring cell interferes, a second base station transmits a superposition of a codeword of first information and a codeword of second information to a fourth terminal and a second terminal, where the first information and the second information are corresponding to the fourth terminal, the fourth terminal is an interference-aligned user terminal, and the second terminal is an edge user terminal served by the first base station; the codeword of the first information corresponding to the fourth terminal is obtained according to a transmit rate and a transmit power for the codeword of the first information corresponding to the fourth terminal, the codeword of the second information corresponding to the fourth terminal is obtained according to a transmit rate and a transmit power for the codeword of the second information corresponding to the fourth terminal, the transmit rate for the codeword of the first information corresponding to the fourth terminal meets a first condition, and a transmit rate for the second information corresponding to the fourth terminal meets a second condition, where the first condition is: when codewords of first information corresponding to (N−1) terminals, other than a third terminal, of N terminals served by the first base station, codewords of second information corresponding to the N terminals, and the codeword of the second information corresponding to the fourth terminal are regarded as noise, a superposition of a codeword of first information corresponding to the third terminal and the codeword of the first information corresponding to the fourth terminal is capable of being decoded correctly at a second terminal of the N terminals, and when the codeword of the second information corresponding to the fourth terminal is regarded as noise, the first information corresponding to the fourth terminal is capable of being decoded correctly at the fourth terminal; the second condition is that correct decoding is capable of being performed at the fourth terminal; and the third terminal is an interference-aligned user terminal

DOWNLINK MULTIPLE ACCESS METHOD, BASE STATION, AND TERMINAL

CROSS-REFERENCE TO RELATED APPLICATIONS

This application is a continuation of International Application No. PCT/CN2014/79868, filed on Jun. 13, 2014, the disclosure of which is hereby incorporated by reference in its entirety.

TECHNICAL FIELD

The present invention relates to the communications field, and in particular, to a downlink multiple access method, a base station, and a terminal.

BACKGROUND

With development of communications technologies, providing a service to multiple terminals (User Equipment, UE) simultaneously by using an orthogonal multiple access (OMA) technology becomes an indispensable function of a cellular communications system. A basic idea of the OMA technology is: partitioning a resource into several mutually orthogonal resource blocks and allocating the resource blocks to different UEs. From a perspective of an information theory, an OMA mechanism is strictly suboptimal in most cases. For detailed analysis, refer to the preface of DESCRIPTION OF EMBODIMENTS, and no details are repeated herein.

It can be known, through analysis, that a transmit rate that can be reached in a superposition coding-successive decoding (SC-SD) mechanism is strictly higher than that in the OMA mechanism. Inspired by the SC-SD mechanism, DoCoMo proposes a multiple access technology named non-orthogonal multiple access (NOMA), where the technology is completely the same as the SC-SD mechanism during an uplink, and therefore, no details are repeated. However, during a downlink, if an operation is intended to be performed successfully, a condition $|h_1| \leq |h_2|$ needs to be satisfied. If $|h_1| > |h_2|$, a message $m_1$ cannot be detected correctly at a terminal 2. Wrong decoding results in error propagation inevitably. In this case, a message $m_2$ also cannot be detected correctly.

Therefore, it can be seen that in the NOMA technology, a UE detection sequence is specified, that is, a UE under a worse channel condition needs to be detected first, and then a UE under a better channel condition is detected. In this case, a transmit rate of the UE that is under the worse channel condition is reduced. A signal from the UE that is under the better channel condition needs to be regarded as noise during detection, which is equivalent to reducing a signal-to-interference-plus-noise ratio (SINR). Therefore, to ensure that a message can be detected correctly, a code rate needs to be reduced. That is, although a sum of rates is increased, what is increased is mainly a rate of the UE that is under the better channel condition. This is unfair to the UE that is under the worse channel condition.

SUMMARY

Embodiments of the present invention provide a downlink multiple access (multi-access, MA) method, a base station, and a terminal, which can implement a flexible compromise on a transmit rate and fairness between different terminals that communicate with a base station.

To achieve the foregoing objective, the embodiments of the present invention provide the following technical solutions.

According to a first aspect, a downlink multiple access MA method is provided. The method includes: transmitting, by a first base station, a superposition of a codeword of first information and a codeword of second information to N terminals, where the first information and the second information are corresponding to each terminal of the N terminals, and N is a positive integer. A codeword of first information corresponding to the $r^{th}$ terminal is obtained according to a transmit rate and a transmit power for the codeword of the first information corresponding to the $r^{th}$ terminal, a codeword of second information corresponding to the $r^{th}$ terminal is obtained according to a transmit rate and a transmit power for the codeword of the second information corresponding to the $r^{th}$ terminal, the transmit rate for the codeword of the first information corresponding to the $r^{th}$ terminal meets a first condition, and the transmit rate for the codeword of the second information corresponding to the $r^{th}$ terminal meets a second condition, where the first condition is: when codewords of second information corresponding to the N terminals are regarded as noise, the first information corresponding to the $r^{th}$ terminal can be decoded correctly at any terminal of the N terminals; the second condition is: when codewords of second information corresponding to the other (N−1) terminals are regarded as noise, the second information corresponding to the $r^{th}$ terminal can be decoded correctly at the $r^{th}$ terminal; and $1 \leq r \leq N$.

With reference to the first aspect, in a first possible implementation manner of the first aspect, the first information is information used by all terminals capable of receiving the first information, to perform joint detection, and the second information is information used by the terminal to perform single-user detection.

With reference to the first possible implementation manner of the first aspect, in a second possible implementation manner of the first aspect, if a detection sequence in successive decoding SD is the $1^{st}$ terminal, the $2^{nd}$ terminal, ..., and the $N^{th}$ terminal, the second condition met by the transmit rate for the codeword of the second information corresponding to the $r^{th}$ terminal includes:

$$R_{rp} \leq \log_2\left(1 + \frac{|h_r|^2 P_{rp}}{N_0 + |h_r|^2 \sum_{j \neq r} P_{rp}}\right), \forall r = 1, 2, \ldots, N;$$

and the first condition met by the transmit rate for the codeword of the first information corresponding to the $r^{th}$ terminal includes:

$$R_{rc} \leq \log_2\left(1 + \frac{|h_m|^2 P_{rc}}{N_0 + |h_m|^2 \sum_r P_{rp} + |h_m|^2 \sum_{j=r+1}^{N} P_{jc}}\right), \forall m, r = 1, 2, \ldots, N,$$

where $R_{rp}$ represents the transmit rate for the codeword of the second information corresponding to the $r^{th}$ terminal; $R_{rc}$ represents the transmit rate for the codeword of the first information corresponding to the $r^{th}$ terminal; $N_0$ represents a local noise power of the $r^{th}$ terminal; $h_r$ represents a channel fading factor between the $r^{th}$ terminal and the first base station; $P_{rp}$ represents the transmit power for the codeword of the second information corresponding to the $r^{th}$ terminal; $P_{jp}$ represents a transmit power for a codeword of second information corresponding to the $j^{th}$ terminal; $h_m$ represents a channel fading factor between the $m^{th}$ terminal and the first base station; $P_{jc}$ represents a transmit power for a codeword of first information corresponding to the $j^{th}$ terminal; $P_{rc}$ represents the transmit power for the codeword of the first information corresponding to the $r^{th}$ terminal; and ∀ represents that the foregoing inequations are true for all values of variants.

With reference to any one of the first aspect, the first possible implementation manner of the first aspect, or the second possible implementation manner of the first aspect, in a third possible implementation manner of the first aspect, if there is interference from a second base station in a neighboring cell, the first condition met by the transmit rate for the codeword of the first information corresponding to the $r^{th}$ terminal includes: a transmit rate for a codeword of first information corresponding to a third terminal of the N terminals meets a third condition, and a transmit rate for a codeword of first information corresponding to the $n^{th}$ terminal of (N−1) terminals, other than the third terminal, of the N terminals meets a fourth condition. The third condition is: when codewords of first information corresponding to the (N−1) terminals, other than the third terminal, of the N terminals, the codewords of the second information corresponding to the N terminals, and a codeword of second information corresponding to a fourth terminal served by the second base station are regarded as noise, a superposition of the codeword of the first information corresponding to the third terminal and a codeword of first information corresponding to the fourth terminal can be decoded correctly at a second terminal of the N terminals, where the second terminal is an edge user terminal served by the first base station, and the third terminal and the fourth terminal are interference-aligned user terminals. The fourth condition is: when the codewords of the second information corresponding to the N terminals and the codeword of the second information corresponding to the fourth terminal are regarded as noise, the first information corresponding to the $n^{th}$ terminal can be decoded correctly at the second terminal, and when the codewords of the second information corresponding to the N terminals are regarded as noise, the first information corresponding to the $n^{th}$ terminal can be decoded correctly at any terminal of (N−1) terminals, other than the second terminal, of the N terminals. The second condition met by the transmit rate for the codeword of the second information corresponding to the $r^{th}$ terminal includes: a transmit rate for a codeword of second information corresponding to the second terminal of the N terminals meets a fifth condition, and a transmit rate for a codeword of second information corresponding to the $s^{th}$ terminal of the other (N−1) terminals than the second terminal of the N terminals meets a sixth condition, where the fifth condition is: when codewords of second information corresponding to the other (N−1) terminals than the second terminal of the N terminals and the codeword of the second information corresponding to the fourth terminal are regarded as noise, the second information corresponding to the second terminal can be decoded correctly at the second terminal; and the sixth condition is: when codewords of second information corresponding to the (N−1) terminals, other than the $s^{th}$ terminal, of the N terminals is regarded as noise, the second information corresponding to the $s^{th}$ terminal can be decoded correctly at the $s^{th}$ terminal.

With reference to the third possible implementation manner of the first aspect, in a fourth possible implementation manner of the first aspect, if the detection sequence in SD is the $1^{st}$ terminal, the $2^{nd}$ terminal, ..., and the $N^{th}$ terminal, the third condition met by the transmit rate for the codeword of the first information corresponding to the third terminal of the N terminals includes:

$$R_{IA} \leq \log_2 \left( 1 + \frac{|h_{k1}|^2 P_{tc} + |h_{k2}|^2 P'_c}{N_0 + |h_{k1}|^2 \sum_{\substack{j=1 \\ j \neq t}}^{N} P_{jc} + |h_{k1}|^2 \sum_{j=1}^{N} P_{jp} + |h_{k2}|^2 P'_p} \right);$$

the fourth condition met by the transmit rate for the codeword of the first information corresponding to the $n^{th}$ terminal of the (N−1) terminals, other than the third terminal, of the N terminals includes:

$$R_{sp} \leq \log_2 \left( 1 + \frac{|h_{k1}|^2 P_{nc}}{N_0 + |h_{k1}|^2 \sum_{\substack{j=n+1 \\ j \neq t}}^{N} P_{jc} + |h_{k1}|^2 \sum_{j=1}^{N} P_{jp} + |h_{k2}|^2 P'_p} \right),$$

$$\forall n = 1, \ldots, t-1, t+1, \ldots, N, \text{ and}$$

$$R_{nc} \leq \log_2 \left( 1 + \frac{|h_{s1}|^2 P_{nc}}{N_0 + |h_{s1}|^2 \sum_{j=n+1}^{N} P_{jc} + |h_{s1}|^2 \sum_{j=1}^{N} P_{jp}} \right),$$

$$\forall n = 1, \ldots, t-1, t+1, \ldots, N; \forall n = 1, \ldots, k-1, k+1, \ldots, N;$$

the fifth condition met by the transmit rate for the codeword of the second information corresponding to the second terminal of the N terminals includes:

$$R_{kp} \leq \log_2 \left( 1 + \frac{|h_{k1}|^2 P_{kp}}{N_0 + |h_{k1}|^2 \sum_{\substack{j=k}}^{N} P_{jp} + |h_{k2}|^2 P'_p} \right);$$

and the sixth condition met by the transmit rate for the codeword of the second information corresponding to the $s^{th}$ terminal of the other (N−1) terminals than the second terminal of the N terminals includes:

$$R_{sp} \leq \log_2 \left( 1 + \frac{|h_{s1}|^2 P_{sp}}{N_0 + |h_{s1}|^2 \sum_{j \neq s} P_{sp}} \right), \forall s = 1, \ldots k-1, k+1, N,$$

where $R_{IA}$ represents a transmit rate for the superposition of the codeword of the first information corresponding to the third terminal and the codeword of the first information corresponding to the fourth terminal; $h_{k1}$ represents a channel fading factor between the second terminal and the first base station; $P_{tc}$ represents the transmit rate for the codeword of the first information corresponding to the third terminal; $h_{k2}$ represents a channel fading factor between the fourth terminal and the second base station; P' represents a transmit power for the codeword of the second information corresponding to the fourth terminal; $N_0$ represents a local noise power; $P_{jp}$ represents the transmit power for the codeword of the second information corresponding to the $j^{th}$ terminal of the N terminals served by the first base station; $P_{jc}$ represents the transmit power for the codeword of the first information corresponding to the $j^{th}$ terminal; $R_{nc}$ represents the transmit rate for the codeword of the first information corresponding to the $n^{th}$ terminal of the (N−1) terminals, other than the third terminal, of the N terminals; $P_{nc}$ represents a transmit power for the codeword of the first information corresponding to the $n^{th}$ terminal; $h_{s1}$ represents a channel fading factor between the $s^{th}$ terminal of the other (N−1) terminals than the second terminal of the N terminals and the first base station; $R_{kp}$, represents the transmit rate for the codeword of the second information corresponding to the second terminal; $P_{kp}$ represents a transmit power for the codeword of the second information corresponding to the second terminal; $P_{sp}$ represents the transmit rate for the codeword of the second information corresponding to the $s^{th}$ terminal; and ∀ represents that the foregoing inequations are true for all values of variants, where a user k is the second terminal served by the first base station, and a user t is the third terminal served by the first base station.

With reference to the fourth possible implementation manner of the first aspect, in a fifth possible implementation manner of the first aspect, that a superposition of the codeword of the first information corresponding to the third terminal and a codeword of first information corresponding to the fourth terminal can be decoded correctly at a second terminal of the N terminals includes: smallest Euclidean distances $d_1$ and $d_2$ between constellation points in a constellation diagram used by a coding and modulating scheme CMS that is corresponding to the codeword of the first information corresponding to the third terminal and the codeword of the first information corresponding to the fourth terminal meet the following conditions respectively:

$$d_1 \geq 2 \frac{\sqrt{N_0 + |h_{k1}|^2 \sum_{j \neq t} P_{jc} + |h_{k1}|^2 \sum_{j=1}^{N} P_{jp} + |h_{k2}|^2 P'_p}}{|h_{k1}|}, \text{ and}$$

$$d_2 \geq 2 \frac{\sqrt{N_0 + |h_{k1}|^2 \sum_{j \neq t} P_{jc} + |h_{k1}|^2 \sum_{j=1}^{N} P_{jp} + |h_{k2}|^2 P'_p}}{|h_{k2}|};$$

and any constellation points $c_{kc}$ and $c_{tc}$ in the constellation diagram meet the following conditions: $h_{k1}c_{kc} \in \{Am: m \in Z^{2 \times 1}\}$ and $h_{k2}c_{tc} \in \{Am: m \in Z^{2 \times 1}\}$, where $A \in C^{1 \times 2}$, A is a preset two-dimensional complex number vector, and $Z^{2 \times 1}$ represents an integer column vector with two rows and one column.

According to a second aspect, a downlink multiple access MA method is provided. The method includes: if there is interference from a first base station in a neighboring cell, transmitting, by a second base station, a superposition of a codeword of first information and a codeword of second information to a fourth terminal and a second terminal, where the first information and the second information are corresponding to the fourth terminal, the fourth terminal is an interference-aligned user terminal, and the second terminal is an edge user terminal served by the first base station. The codeword of the first information corresponding to the fourth terminal is obtained according to a transmit rate and a transmit power for the codeword of the first information corresponding to the fourth terminal, the codeword of the second information corresponding to the fourth terminal is obtained according to a transmit rate and a transmit power for the codeword of the second information corresponding to the fourth terminal, the transmit rate for the codeword of the first information corresponding to the fourth terminal meets a first condition, and a transmit rate for the second information corresponding to the fourth terminal meets a second condition, where the first condition is: when codewords of first information corresponding to (N−1) terminals, other than a third terminal, of N terminals served by the first base station, codewords of second information corresponding to the N terminals, and the codeword of the second information corresponding to the fourth terminal are regarded as noise, a superposition of a codeword of first information corresponding to the third terminal and the codeword of the first information corresponding to the fourth terminal can be decoded correctly at a second terminal of the N terminals, and when the codeword of the second information corresponding to the fourth terminal is regarded as noise, the first information corresponding to the fourth terminal can be decoded correctly at the fourth terminal; the second condition is that correct decoding can be performed at the fourth terminal; and the third terminal is an interference-aligned user terminal.

With reference to the second aspect, in a first possible implementation manner of the second aspect, the first information is information used by all terminals capable of receiving the first information, to perform joint detection, and the second information is information used by the terminal to perform single-user detection.

With reference to the first possible implementation manner of the second aspect, in a second possible implementation manner of the second aspect, the first condition met by the transmit rate for the codeword of the first information corresponding to the fourth terminal includes:

$$R_{IA} \leq \log_2 \left(1 + \frac{|h_{k1}|^2 P_{tc} + |h_{k2}|^2 P'_c}{N_0 + |h_{k1}|^2 \sum_{j \neq t}^{N} P_{jc} + |h_{k1}|^2 \sum_{j=1}^{N} P_{jp} + |h_{k2}|^2 P'_p}\right), \text{ and}$$

$$R'_c \leq \log_2 \left(1 + \frac{|h'|^2 P'_c}{N_0 + |h'|^2 P'_p}\right);$$

and the second condition met by the transmit rate for the second information corresponding to the fourth terminal includes:

$$R'_p \leq \log_2 \left(1 + \frac{|h'|^2 P'_p}{N_0}\right),$$

where $R_c'$ represents the transmit rate for the codeword of the first information corresponding to the fourth terminal; $R_p'$ represents the transmit rate for the codeword of the second information corresponding to the fourth terminal; $R_{IA}$ represents a transmit rate for the superposition of the codeword of the first information corresponding to the third terminal and the codeword of the first information corresponding to the fourth terminal; $N_0$ represents a local noise power of the fourth terminal; $h_{k1}$ represents a channel fading factor between the second terminal and the first base station; $h_{k2}$ represents a channel fading factor between the second terminal and the second base station; h' represents a channel fading factor between the fourth terminal and the second base station; $P_{jp}$ represents a transmit power for a codeword of second information corresponding to the $j^{th}$ terminal of the N terminals served by the first base station; $P_{jc}$ represents a transmit power for a codeword of first information corresponding to the $j^{th}$ terminal; $P_p'$ represents the transmit power for the codeword of the second information corresponding to the fourth terminal; and $P_c'$ represents the transmit power for the codeword of the first information corresponding to the fourth terminal, where a user k is the second terminal served by the first base station, and a user t is the third terminal served by the first base station.

With reference to any one of the second aspect, the first possible implementation manner of the second aspect, or the second possible implementation manner of the second aspect, in a third possible implementation manner of the second aspect, that a superposition of a codeword of first information corresponding to the third terminal and the codeword of the first information corresponding to the fourth terminal can be decoded correctly at a second terminal of the N terminals includes: smallest Euclidean distances $d_1$ and $d_2$ between constellation points in a constellation diagram used by a coding and modulating scheme CMS that is corresponding to the codeword of the first information corresponding to the third terminal and the codeword of the first information corresponding to the fourth terminal meet the following conditions respectively:

$$d_1 \geq 2\frac{\sqrt{N_0 + |h_{k1}|^2 \sum_{j \neq t} P_{jc} + |h_{k1}|^2 \sum_{j=1}^{N} P_{jp} + |h_{k2}|^2 P_p'}}{|h_{k1}|}, \text{ and}$$

$$d_2 \geq 2\frac{\sqrt{N_0 + |h_{k1}|^2 \sum_{j \neq t} P_{jc} + |h_{k1}|^2 \sum_{j=1}^{N} P_{jp} + |h_{k2}|^2 P_p'}}{|h_{k2}|};$$

and any constellation points $c_{kc}$ and $c_{tc}$ in the constellation diagram meet the following conditions: $h_{k1}c_{kc} \in \{Am: m \in Z^{2 \times 1}\}$ and $h_{k2}c_{tc} \in \{Am: m \in Z^{2 \times 1}\}$, where a channel fading factor for a terminal is corresponding to the constellation point, $A \in C^{1 \times 2}$, A is a preset two-dimensional complex number vector, and $Z^{2 \times 1}$ represents an integer column vector with two rows and one column.

According to a third aspect, a downlink multiple access MA method is provided, and applied to a cellular communications system, where channels between M first terminals and a first base station that are in the cellular communications system belong to a first channel, a channel between a second terminal and the first base station belongs to a second channel, and a channel fading factor of the first channel is greater than a channel fading factor of the second channel, where $M \geq 1$, and M is an integer. The method includes: obtaining, by a fifth terminal, a first received signal, where the fifth terminal is any terminal of the M first terminals or the second terminal; and determining, by the fifth terminal according to the first received signal and with reference to a preconfigured first receiving policy, first information and second information that are corresponding to the fifth terminal. The first receiving policy is a receiving policy meeting that both the first information and the second information that are corresponding to the fifth terminal are decoded correctly.

With reference to the third aspect, in a first possible implementation manner of the third aspect, the first information is information used by all terminals capable of receiving the first information, to perform joint detection, and the second information is information used by the terminal to perform single-user detection.

With reference to the first possible implementation manner of the third aspect, in a second possible implementation manner of the third aspect, the first receiving policy includes: after the fifth terminal obtains the first received signal, detecting, by the fifth terminal according to the first received signal, first information corresponding to the M first terminals; obtaining a second signal according to the first received signal and the first information corresponding to the M first terminals; detecting, according to the second signal, first information corresponding to the second terminal; obtaining a third signal according to the second signal and the first information corresponding to the second terminal; and detecting, according to the third signal, the second information corresponding to the fifth terminal.

With reference to the first possible implementation manner of the third aspect, in a third possible implementation manner of the third aspect, the cellular communications system further includes a second base station, interference exists between the first base station and the second base station, and a center user terminal served by the second base station is a fourth terminal. If the fifth terminal is the second terminal, the first receiving policy includes: after the second terminal obtains the first received signal, detecting, by the second terminal according to the first received signal, a superposition of a codeword of first information corresponding to a third terminal served by the first base station and a codeword of first information corresponding to the fourth terminal, where the third terminal and the fourth terminal are interference-aligned user terminals; obtaining a second signal according to the first received signal and the superposition of the codeword of the first information corresponding to the third terminal served by the first base station and the codeword of the first information corresponding to the fourth terminal; if M=1, detecting, according to the second signal, the first information corresponding to the second terminal; obtaining a third signal according to the second signal and the first information corresponding to the second terminal; and detecting, according to the third signal, the second information corresponding to the second terminal; or if M>1, detecting, according to the second signal, first information corresponding to (M−1) first terminals, other than the third terminal, of the M first terminals; obtaining a third signal according to the second signal and the first information corresponding to the (M−1) first terminals, other than the third terminal, of the M first terminals; detecting, according to the third signal, the first information corresponding to the second terminal; obtaining a fourth signal according to the third signal and the first information corresponding to the second terminal; and detecting, according to the fourth signal, the second information corresponding to the second terminal.

According to a fourth aspect, a downlink multiple access MA method is provided, and applied to a cellular communications system, where the cellular communications system includes a first base station and a second base station, interference exists between the first base station and the second base station, and a center user terminal served by the second base station is a fourth terminal. The method includes: obtaining, by the fourth terminal, a first received signal; and determining, by the fourth terminal according to the first received signal and with reference to a preconfigured second receiving policy, first information and second information that are corresponding to the fourth terminal. The second receiving policy is a receiving policy meeting that both the first information and the second information that are corresponding to the fourth terminal are decoded correctly.

With reference to the fourth aspect, in a first possible implementation manner of the fourth aspect, the first information is information used by all terminals capable of receiving the first information, to perform joint detection, and the second information is information used by the terminal to perform single-user detection.

With reference to the first possible implementation manner of the fourth aspect, in a second possible implementation manner of the fourth aspect, the second receiving policy includes: after the fourth terminal obtains the first received signal, detecting, by the fourth terminal according to the first received signal, the first information corresponding to the fourth terminal; obtaining a second signal according to the first received signal and the first information corresponding to the fourth terminal; and detecting, according to the second signal, the second information corresponding to the fourth terminal.

According to a fifth aspect, a first base station is provided, where the first base station includes a transmission unit and a processing unit, where the transmission unit is configured to transmit a superposition of a codeword of first information and a codeword of second information to N terminals, where the first information and the second information are corresponding to each terminal of the N terminals, and N is a positive integer; and a codeword of first information corresponding to the $r^{th}$ terminal is obtained by the processing unit according to a transmit rate and a transmit power for the codeword of the first information corresponding to the $r^{th}$ terminal, a codeword of second information corresponding to the $r^{th}$ terminal is obtained by the processing unit according to a transmit rate and a transmit power for the codeword of the second information corresponding to the $r^{th}$ terminal, the transmit rate for the codeword of the first information corresponding to the $r^{th}$ terminal meets a first condition, and the transmit rate for the codeword of the second information corresponding to the $r^{th}$ terminal meets a second condition, where the first condition is: when codewords of second information corresponding to the N terminals are regarded as noise, the first information corresponding to the $r^{th}$ terminal can be decoded correctly at any terminal of the N terminals; the second condition is: when codewords of second information corresponding to the other (N−1) terminals are regarded as noise, the second information corresponding to the $r^{th}$ terminal can be decoded correctly at the $r^{th}$ terminal; and $1 \le r \le N$.

With reference to the fifth aspect, in a first possible implementation manner of the fifth aspect, the first information is information used by all terminals capable of receiving the first information, to perform joint detection, and the second information is information used by the terminal to perform single-user detection.

With reference to the first possible implementation manner of the fifth aspect, in a second possible implementation manner of the fifth aspect, if a detection sequence in successive decoding SD is the $1^{st}$ terminal, the $2^{nd}$ terminal, ..., and the $N^{th}$ terminal, the second condition met by the transmit rate for the codeword of the second information corresponding to the $r^{th}$ terminal includes:

$$R_{rp} \le \log_2\left(1 + \frac{|h_r|^2 P_{rp}}{N_0 + |h_r|^2 \sum_{j \ne r} P_{rp}}\right), \forall r = 1, 2, \ldots, N;$$

and the first condition met by the transmit rate for the codeword of the first information corresponding to the $r^{th}$ terminal includes:

$$R_{rc} \le \log_2\left(1 + \frac{|h_m|^2 P_{rc}}{N_0 + |h_m|^2 \sum_r P_{rp} + |h_m|^2 \sum_{j=r+1}^{N} P_{jc}}\right), \forall m, r = 1, 2, \ldots, N,$$

where $R_{rp}$ represents the transmit rate for the codeword of the second information corresponding to the $r^{th}$ terminal; $R_{rc}$ represents the transmit rate for the codeword of the first information corresponding to the $r^{th}$ terminal; $N_0$ represents a local noise power of the $r^{th}$ terminal; $h_r$ represents a channel fading factor between the $r^{th}$ terminal and the first base station; $P_{rp}$ represents the transmit power for the codeword of the second information corresponding to the $r^{th}$ terminal; $P_{jp}$ represents a transmit power for a codeword of second information corresponding to the $j^{th}$ terminal; $h_m$ represents a channel fading factor between the $m^{th}$ terminal and the first base station; $P_{jc}$ represents a transmit power for a codeword of first information corresponding to the $j^{th}$ terminal; $P_{rc}$ represents the transmit power for the codeword of the first information corresponding to the $r^{th}$ terminal; and $\forall$ represents that the foregoing inequations are true for all values of variants.

With reference to any one of the fifth aspect, the first possible implementation manner of the fifth aspect, or the second possible implementation manner of the fifth aspect, in a third possible implementation manner of the fifth aspect, if there is interference from a second base station in a neighboring cell, the first condition met by the transmit rate for the codeword of the first information corresponding to the $r^{th}$ terminal includes: a transmit rate for a codeword of first information corresponding to a third terminal of the N terminals meets a third condition, and a transmit rate for a codeword of first information corresponding to the $n^{th}$ terminal of (N−1) terminals, other than the third terminal, of the N terminals meets a fourth condition, where the third condition is: when codewords of first information corresponding to the (N−1) terminals, other than the third terminal, of the N terminals, the codewords of the second information corresponding to the N terminals, and a codeword of second information corresponding to a fourth terminal served by the second base station are regarded as noise, a superposition of the codeword of the first information corresponding to the third terminal and a codeword of first information corresponding to the fourth terminal can be decoded correctly at a second terminal of the N terminals, where the second terminal is an edge user terminal served by the first base station, and the third terminal and the fourth terminal are interference-aligned user terminals; and the fourth condition is: when the codewords of the second information corresponding to the N terminals and the codeword of the second information corresponding to the fourth terminal are regarded as noise, the first information corresponding to the $n^{th}$ terminal can be decoded correctly at the second terminal, and when the codewords of the second information corresponding to the N terminals are regarded as noise, the first information corresponding to the $n^{th}$ terminal can be decoded correctly at any terminal of (N−1) terminals, other than the second terminal, of the N terminals; and the second condition met by the transmit rate for the codeword of the second information corresponding to the $r^{th}$ terminal includes: a transmit rate for a codeword of second information corresponding to the second terminal of the N terminals meets a fifth condition, and a transmit rate for a codeword of second information corresponding to the $s^{th}$ terminal of the other (N−1) terminals than the second terminal of the N terminals meets a sixth condition, where the fifth condition is: when codewords of second information corresponding to the other (N−1) terminals than the second terminal of the N terminals and the codeword of the second information corresponding to the fourth terminal are regarded as noise, the second information corresponding to the second terminal can be decoded correctly at the second terminal; and the sixth condition is: when codewords of second information corresponding to the (N−1) terminals, other than the $s^{th}$ terminal, of the N terminals is regarded as noise, the second information corresponding to the $s^{th}$ terminal can be decoded correctly at the $s^{th}$ terminal.

With reference to the third possible implementation manner of the fifth aspect, in a fourth possible implementation manner of the fifth aspect, if the detection sequence in SD is the $1^{st}$ terminal, the $2^{nd}$ terminal, ..., and the $N^{th}$ terminal, the third condition met by the transmit rate for the codeword of the first information corresponding to the third terminal of the N terminals includes:

$$R_{IA} \leq \log_2\left(1 + \frac{|h_{k1}|^2 P_{tc} + |h_{k2}|^2 P'_c}{N_0 + |h_{k1}|^2 \sum_{j \neq t}^{N} P_{jc} + |h_{k1}|^2 \sum_{j=1}^{N} P_{jp} + |h_{k2}|^2 P'_p}\right);$$

the fourth condition met by the transmit rate for the codeword of the first information corresponding to the $n^{th}$ terminal of the (N−1) terminals, other than the third terminal, of the N terminals includes:

$$R_{nc} \leq \log_2\left(1 + \frac{|h_{k1}|^2 P_{nc}}{N_0 + |h_{k1}|^2 \sum_{\substack{j=n+1 \\ j \neq t}}^{N} P_{jc} + |h_{k1}|^2 \sum_{j=1}^{N} P_{jp} + |h_{k2}|^2 P'_p}\right),$$

$$\forall n = 1, \ldots, t-1, t+1, \ldots, N, \text{ and}$$

$$R_{nc} \leq \log_2\left(1 + \frac{|h_{s1}|^2 P_{nc}}{N_0 + |h_{s1}|^2 \sum_{j=n+1}^{N} P_{jc} + |h_{s1}|^2 \sum_{j=1}^{N} P_{jp}}\right),$$

$$\forall n = 1, \ldots, t-1, t+1, \ldots, N;$$

$$\forall n = 1, \ldots, k-1, k+1, \ldots, N;$$

the fifth condition met by the transmit rate for the codeword of the second information corresponding to the second terminal of the N terminals includes:

$$R_{kp} \leq \log_2\left(1 + \frac{|h_{k1}|^2 P_{kp}}{N_0 + |h_{k1}|^2 \sum_{j \neq k}^{N} P_{jp} + |h_{k2}|^2 P'_p}\right);$$

and the sixth condition met by the transmit rate for the codeword of the second information corresponding to the $s^{th}$ terminal of the other (N−1) terminals than the second terminal of the N terminals includes:

$$R_{sp} \leq \log_2\left(1 + \frac{|h_{s1}|^2 P_{sp}}{N_0 + |h_{s1}|^2 \sum_{j \neq s}^{N} P_{sp}}\right), \forall s = 1, \ldots k-1, k+1, N,$$

where $R_{IA}$ represents a transmit rate for the superposition of the codeword of the first information corresponding to the third terminal and the codeword of the first information corresponding to the fourth terminal; $h_{k1}$ represents a channel fading factor between the second terminal and the first base station; $P_{tc}$ represents the transmit rate for the codeword of the first information corresponding to the third terminal; $h_{k2}$ represents a channel fading factor between the fourth terminal and the second base station; P' represents a transmit power for the codeword of the second information corresponding to the fourth terminal; $N_0$ represents a local noise power; $P_{jp}$ represents the transmit power for the codeword of the second information corresponding to the $j^{th}$ terminal of the N terminals served by the first base station; $P_{jc}$ represents the transmit power for the codeword of the first information corresponding to the $j^{th}$ terminal; $R_{nc}$ represents the transmit rate for the codeword of the first information corresponding to the $n^{th}$ terminal of the (N−1) terminals, other than the third terminal, of the N terminals; $P_{nc}$ represents a transmit power for the codeword of the first information corresponding to the $n^{th}$ terminal; $h_{s1}$ represents a channel fading factor between the $s^{th}$ terminal of the other (N−1) terminals than the second terminal of the N terminals and the first base station; $R_{kp}$ represents the transmit rate for the codeword of the second information corresponding to the second terminal; $P_{kp}$ represents a transmit power for the codeword of the second information corresponding to the second terminal; $P_{sp}$ represents the transmit rate for the codeword of the second information corresponding to the $s^{th}$ terminal; and $\forall$ represents that the foregoing inequations are true for all values of variants, where a user k is the second terminal served by the first base station, and a user t is the third terminal served by the first base station.

With reference to the fourth possible implementation manner of the fifth aspect, in a fifth possible implementation manner of the fifth aspect, that a superposition of the codeword of the first information corresponding to the third terminal and a codeword of first information corresponding to the fourth terminal can be decoded correctly at a second terminal of the N terminals includes:

smallest Euclidean distances $d_1$ and $d_2$ between constellation points in a constellation diagram used by a coding and modulating scheme CMS that is corresponding to the codeword of the first information corresponding to the third terminal and the codeword of the first information corresponding to the fourth terminal meet the following conditions respectively:

$$d_1 \geq 2\frac{\sqrt{N_0 + |h_{k1}|^2 \sum_{j \neq t} P_{jc} + |h_{k1}|^2 \sum_{j=1}^{N} P_{jp} + |h_{k2}|^2 P'_p}}{|h_{k1}|}, \text{ and}$$

$$d_2 \geq 2\frac{\sqrt{N_0 + |h_{k1}|^2 \sum_{j \neq t} P_{jc} + |h_{k1}|^2 \sum_{j=1}^{N} P_{jp} + |h_{k2}|^2 P'_p}}{|h_{k2}|};$$

and any constellation points $c_{kc}$ and $c_{tc}$ in the constellation diagram meet the following conditions: $h_{k1}c_{kc} \in \{Am: m \in Z^{2 \times 1}\}$ and $h_{k2}c_{tc} \in \{Am: m \in Z^{2 \times 1}\}$, where $A \in C^{1 \times 2}$, A is a preset two-dimensional complex number vector, and $Z^{2 \times 1}$ represents an integer column vector with two rows and one column.

According to a sixth aspect, a second base station is provided, where the second base station includes a transmission unit and a processing unit. The transmission unit is configured to: if there is interference from a first base station in a neighboring cell, transmit a superposition of a codeword of first information and a codeword of second information to a fourth terminal and a second terminal, where the first information and the second information are corresponding to the fourth terminal, the fourth terminal is an interference-aligned user terminal, and the second terminal is an edge user terminal served by the first base station. The codeword of the first information corresponding to the fourth terminal is obtained by the processing unit according to a transmit rate and a transmit power for the codeword of the first information corresponding to the fourth terminal, the codeword of the second information corresponding to the fourth terminal is obtained by the processing unit according to a transmit rate and a transmit power for the codeword of the second information corresponding to the fourth terminal, the transmit rate for the codeword of the first information corresponding to the fourth terminal meets a first condition, and a transmit rate for the second information corresponding to the fourth terminal meets a second condition, where the first condition is: when codewords of first information corresponding to (N−1) terminals, other than a third terminal, of N terminals served by the first base station, codewords of second information corresponding to the N terminals, and the codeword of the second information corresponding to the fourth terminal are regarded as noise, a superposition of a codeword of first information corresponding to the third terminal and the codeword of the first information corresponding to the fourth terminal can be decoded correctly at a second terminal of the N terminals, and when the codeword of the second information corresponding to the fourth terminal is regarded as noise, the first information corresponding to the fourth terminal can be decoded correctly at the fourth terminal; the second condition is that correct decoding can be performed at the fourth terminal; and the third terminal is an interference-aligned user terminal.

With reference to the sixth aspect, in a first possible implementation manner of the sixth aspect, the first information is information used by all terminals capable of receiving the first information, to perform joint detection, and the second information is information used by the terminal to perform single-user detection.

With reference to the first possible implementation manner of the sixth aspect, in a second possible implementation manner of the sixth aspect, the first condition met by the transmit rate for the codeword of the first information corresponding to the fourth terminal includes:

$$R_{IA} \leq \log_2\left(1 + \frac{|h_{k1}|^2 P_{tc} + |h_{k2}|^2 P'_c}{N_0 + |h_{k1}|^2 \sum_{j \neq t}^{N} P_{jc} + |h_{k1}|^2 \sum_{j=1}^{N} P_{jp} + |h_{k2}|^2 P'_p}\right), \text{ and}$$

$$R'_c \leq \log_2\left(1 + \frac{|h'|^2 P'_c}{N_0 + |h'|^2 P'_p}\right);$$

and the second condition met by the transmit rate for the second information corresponding to the fourth terminal includes:

$$R'_p \leq \log_2\left(1 + \frac{|h'|^2 P'_p}{N_0}\right),$$

where $R_c'$ represents the transmit rate for the codeword of the first information corresponding to the fourth terminal; $R_p'$ represents the transmit rate for the codeword of the second information corresponding to the fourth terminal; $R_{IA}$ represents a transmit rate for the superposition of the codeword of the first information corresponding to the third terminal and the codeword of the first information corresponding to the fourth terminal; $N_0$ represents a local noise power of the fourth terminal; $h_{k1}$ represents a channel fading factor between the second terminal and the first base station; $h_{k2}$ represents a channel fading factor between the second terminal and the second base station; h' represents a channel fading factor between the fourth terminal and the second base station; $P_{jp}$ represents a transmit power for a codeword of second information corresponding to the $j^{th}$ terminal of the N terminals served by the first base station; $P_{jc}$ represents a transmit power for a codeword of first information corresponding to the $j^{th}$ terminal; $P_p'$ represents the transmit power for the codeword of the second information corresponding to the fourth terminal; and $P_c'$ represents the transmit power for the codeword of the first information corresponding to the fourth terminal, where a user k is the second terminal served by the first base station, and a user t is the third terminal served by the first base station.

With reference to any one of the sixth aspect, the first possible implementation manner of the sixth aspect, or the second possible implementation manner of the sixth aspect, in a third possible implementation manner of the sixth aspect, that a superposition of a codeword of first information corresponding to the third terminal and the codeword of the first information corresponding to the fourth terminal can be decoded correctly at a second terminal of the N terminals includes: smallest Euclidean distances $d_1$ and $d_2$ between constellation points in a constellation diagram used by a coding and modulating scheme CMS that is corresponding to the codeword of the first information corresponding to the third terminal and the codeword of the first information corresponding to the fourth terminal meet the following conditions respectively:

$$d_1 \geq 2\frac{\sqrt{N_0 + |h_{k1}|^2 \sum_{j \neq t} P_{jc} + |h_{k1}|^2 \sum_{j=1}^{N} P_{jp} + |h_{k2}|^2 P'_p}}{|h_{k1}|}, \text{ and}$$

$$d_2 \geq 2 \frac{\sqrt{N_0 + |h_{k1}|^2 \sum_{j \neq t} P_{jc} + |h_{k1}|^2 \sum_{j=1}^{N} P_{jp} + |h_{k2}|^2 P_p'}}{|h_{k2}|};$$

and any constellation points $c_{k_c}$ and $c_{t_c}$ in the constellation diagram meet the following conditions: $h_{k1}c_{k_c} \in \{Am: m \in Z^{2 \times 1}\}$ and $h_{k2}c_{t_c} \in \{Am: m \in Z^{2 \times 1}\}$, where a channel fading factor for a terminal is corresponding to the constellation point, $A \in C^{1 \times 2}$, A is a preset two-dimensional complex number vector, and $Z^{2 \times 1}$ represents an integer column vector with two rows and one column.

According to a seventh aspect, a fifth terminal is provided, and applied to a cellular communications system, where channels between M first terminals and a first base station that are in the cellular communications system belong to a first channel, a channel between a second terminal and the first base station belongs to a second channel, and a channel fading factor of the first channel is greater than a channel fading factor of the second channel, where M≤1, and M is an integer; the fifth terminal is any terminal of the M first terminals or the second terminal; and the fifth terminal includes an obtaining unit and a determining unit, where the obtaining unit is configured to obtain a first received signal. The determining unit is configured to determine, according to the first received signal and with reference to a preconfigured first receiving policy, first information and second information that are corresponding to the fifth terminal, where the first receiving policy is a receiving policy meeting that both the first information and the second information that are corresponding to the fifth terminal are decoded correctly.

With reference to the seventh aspect, in a first possible implementation manner of the seventh aspect, the first information is information used by all terminals capable of receiving the first information, to perform joint detection, and the second information is information used by the terminal to perform single-user detection.

With reference to the first possible implementation manner of the seventh aspect, in a second possible implementation manner of the seventh aspect, the first receiving policy includes: after the fifth terminal obtains the first received signal, detecting, by the fifth terminal according to the first received signal, first information corresponding to the M first terminals; obtaining a second signal according to the first received signal and the first information corresponding to the M first terminals; detecting, according to the second signal, first information corresponding to the second terminal; obtaining a third signal according to the second signal and the first information corresponding to the second terminal; and detecting, according to the third signal, the second information corresponding to the fifth terminal.

With reference to the first possible implementation manner of the seventh aspect, in a third possible implementation manner of the seventh aspect, the cellular communications system further includes a second base station, interference exists between the first base station and the second base station, and a center user terminal served by the second base station is a fourth terminal; and if the fifth terminal is the second terminal, the first receiving policy includes: after the second terminal obtains the first received signal, detecting, by the second terminal according to the first received signal, a superposition of a codeword of first information corresponding to a third terminal served by the first base station and a codeword of first information corresponding to the fourth terminal, where the third terminal and the fourth terminal are interference-aligned user terminals; obtaining a second signal according to the first received signal and the superposition of the codeword of the first information corresponding to the third terminal served by the first base station and the codeword of the first information corresponding to the fourth terminal; if M=1, detecting, according to the second signal, the first information corresponding to the second terminal; obtaining a third signal according to the second signal and the first information corresponding to the second terminal; and detecting, according to the third signal, the second information corresponding to the second terminal; or if M>1, detecting, according to the second signal, first information corresponding to (M−1) first terminals, other than the third terminal, of the M first terminals; obtaining a third signal according to the second signal and the first information corresponding to the (M−1) first terminals, other than the third terminal, of the M first terminals; detecting, according to the third signal, the first information corresponding to the second terminal; obtaining a fourth signal according to the third signal and the first information corresponding to the second terminal; and detecting, according to the fourth signal, the second information corresponding to the second terminal.

According to an eighth aspect, a fourth terminal is provided, and applied to a cellular communications system, where the cellular communications system includes a first base station and a second base station, interference exists between the first base station and the second base station, and a center user terminal served by the second base station is the fourth terminal; and the fourth terminal includes an obtaining unit and a determining unit. The obtaining unit is configured to obtain a first received signal. The fourth terminal determines, according to the first received signal and with reference to a preconfigured second receiving policy, first information and second information that are corresponding to the fourth terminal, where the second receiving policy is a receiving policy meeting that both the first information and the second information that are corresponding to the fourth terminal are decoded correctly.

With reference to the eighth aspect, in a first possible implementation manner of the eighth aspect, the first information is information used by all terminals capable of receiving the first information, to perform joint detection, and the second information is information used by the terminal to perform single-user detection.

With reference to the eighth aspect, in a second possible implementation manner of the eighth aspect, the second receiving policy includes: after the fourth terminal obtains the first received signal, detecting, by the fourth terminal according to the first received signal, the first information corresponding to the fourth terminal; obtaining a second signal according to the first received signal and the first information corresponding to the fourth terminal; and detecting, according to the second signal, the second information corresponding to the fourth terminal.

According to a ninth aspect, a first base station is provided, where the first base station includes a transmitter and a processor. The transmitter is configured to transmit a superposition of a codeword of first information and a codeword of second information to N terminals, where the first information and the second information are corresponding to each terminal of the N terminals, and N is a positive integer. A codeword of first information corresponding to the $r^{th}$ terminal is obtained by the processor according to a transmit rate and a transmit power for the codeword of the first information corresponding to the $r^{th}$ terminal, a codeword of second information corresponding to the $r^{th}$ terminal is obtained by the processor according to a transmit rate and a transmit power for the codeword of the second information corresponding to the $r^{th}$ terminal, the transmit rate for the codeword of the first information corresponding to the $r^{th}$ terminal meets a first condition, and the transmit rate for the codeword of the second information corresponding to the $r^{th}$ terminal meets a second condition, where the first condition is: when codewords of second information corresponding to the N terminals are regarded as noise, the first information corresponding to the $r^{th}$ terminal can be decoded correctly at any terminal of the N terminals; the second condition is: when codewords of second information corresponding to the other (N−1) terminals are regarded as noise, the second information corresponding to the $r^{th}$ terminal can be decoded correctly at the $r^{th}$ terminal; and $1 \leq r \leq N$.

With reference to the ninth aspect, in a first possible implementation manner of the ninth aspect, the first information is information used by all terminals capable of receiving the first information, to perform joint detection, and the second information is information used by the terminal to perform single-user detection.

With reference to the first possible implementation manner of the ninth aspect, in a second possible implementation manner of the ninth aspect, if a detection sequence in successive decoding SD is the $1^{st}$ terminal, the $2^{nd}$ terminal, ..., and the $N^{th}$ terminal, the second condition met by the transmit rate for the codeword of the second information corresponding to the $r^{th}$ terminal includes:

$$R_{rp} \leq \log_2\left(1 + \frac{|h_r|^2 P_{rp}}{N_0 + |h_r|^2 P_{rp}}\right), \forall r = 1, 2, \ldots, N;$$

and the first condition met by the transmit rate for the codeword of the first information corresponding to the $r^{th}$ terminal includes:

$$R_{rc} \leq \log_2\left(1 + \frac{|h_m|^2 P_{rc}}{N_0 + |h_m|^2 \sum_r P_{rp} + |h_m|^2 \sum_{j=r+1}^{N} P_{jc}}\right),$$

$\forall m, r = 1, 2, \ldots N,$ where $R_{rp}$ represents the transmit rate for the codeword of the second information corresponding to the $r^{th}$ terminal; $R_{rc}$ represents the transmit rate for the codeword of the first information corresponding to the $r^{th}$ terminal; $N_0$ represents a local noise power of the $r^{th}$ terminal; $h_r$ represents a channel fading factor between the $r^{th}$ terminal and the first base station; $P_{rp}$ represents the transmit power for the codeword of the second information corresponding to the $r^{th}$ terminal; $P_{jp}$ represents a transmit power for a codeword of second information corresponding to the $j^{th}$ terminal; $h_m$ represents a channel fading factor between the $m^{th}$ terminal and the first base station; $P_{jc}$ represents a transmit power for a codeword of first information corresponding to the $j^{th}$ terminal; $P_{rc}$ represents the transmit power for the codeword of the first information corresponding to the $r^{th}$ terminal; and $\forall$ represents that the foregoing inequations are true for all values of variants.

With reference to any one of the ninth aspect, the first possible implementation manner of the ninth aspect, or the second possible implementation manner of the ninth aspect, in a third possible implementation manner of the ninth aspect, if there is interference from a second base station in a neighboring cell, the first condition met by the transmit rate for the codeword of the first information corresponding to the $r^{th}$ terminal includes: a transmit rate for a codeword of first information corresponding to a third terminal of the N terminals meets a third condition, and a transmit rate for a codeword of first information corresponding to the $n^{th}$ terminal of (N−1) terminals, other than the third terminal, of the N terminals meets a fourth condition, where the third condition is: when codewords of first information corresponding to the (N−1) terminals, other than the third terminal, of the N terminals, the codewords of the second information corresponding to the N terminals, and a codeword of second information corresponding to a fourth terminal served by the second base station are regarded as noise, a superposition of the codeword of the first information corresponding to the third terminal and a codeword of first information corresponding to the fourth terminal can be decoded correctly at a second terminal of the N terminals, where the second terminal is an edge user terminal served by the first base station, and the third terminal and the fourth terminal are interference-aligned user terminals; and the fourth condition is: when the codewords of the second information corresponding to the N terminals and the codeword of the second information corresponding to the fourth terminal are regarded as noise, the first information corresponding to the $n^{th}$ terminal can be decoded correctly at the second terminal, and when the codewords of the second information corresponding to the N terminals are regarded as noise, the first information corresponding to the $n^{th}$ terminal can be decoded correctly at any terminal of (N−1) terminals, other than the second terminal, of the N terminals; and the second condition met by the transmit rate for the codeword of the second information corresponding to the $r^{th}$ terminal includes: a transmit rate for a codeword of second information corresponding to the second terminal of the N terminals meets a fifth condition, and a transmit rate for a codeword of second information corresponding to the $s^{th}$ terminal of the other (N−1) terminals than the second terminal of the N terminals meets a sixth condition, where the fifth condition is: when codewords of second information corresponding to the other (N−1) terminals than the second terminal of the N terminals and the codeword of the second information corresponding to the fourth terminal are regarded as noise, the second information corresponding to the second terminal can be decoded correctly at the second terminal; and the sixth condition is: when codewords of second information corresponding to the (N−1) terminals, other than the $s^{th}$ terminal, of the N terminals is regarded as noise, the second information corresponding to the $s^{th}$ terminal can be decoded correctly at the $s^{th}$ terminal.

With reference to the third possible implementation manner of the ninth aspect, in a fourth possible implementation manner of the ninth aspect, if the detection sequence in SD is the $1^{st}$ terminal, the $2^{nd}$ terminal, ..., and the $N^{th}$ terminal, the third condition met by the transmit rate for the codeword of the first information corresponding to the third terminal of the N terminals includes:

$$R_{IA} \leq \log_2\left(1 + \frac{|h_{k1}|^2 P_{tc} + |h_{k2}|^2 P'_c}{N_0 + |h_{k1}|^2 \sum_{j \neq t}^{N} P_{jc} + |h_{k1}|^2 \sum_{j=1}^{N} P_{jp} + |h_{k2}|^2 P'_p}\right);$$

the fourth condition met by the transmit rate for the codeword of the first information corresponding to the $n^{th}$ terminal of the (N−1) terminals, other than the third terminal, of the N terminals includes:

$$R_{nc} \leq \log_2\left(1 + \frac{|h_{k1}|^2 P_{nc}}{N_0 + |h_{k1}|^2 \sum_{\substack{j=n+1 \\ j \neq t}}^{N} P_{jc} + |h_{k1}|^2 \sum_{j=1}^{N} P_{jp} + |h_{k2}|^2 P'_p}\right),$$

$\forall n = 1, \ldots, t-1, t+1, \ldots, N$, and $$R_{nc} \leq \log_2\left(1 + \frac{|h_{s1}|^2 P_{nc}}{N_0 + |h_{s1}|^2 \sum_{j=n+1}^{N} P_{jc} + |h_{s1}|^2 \sum_{j=1}^{N} P_{jp}}\right),$$

$\forall n = 1, \ldots, t-1, t+1, \ldots, N$ $\forall s = 1, \ldots, k-1, k+1, \ldots, N;$ the fifth condition met by the transmit rate for the codeword of the second information corresponding to the second terminal of the N terminals includes:

$$R_{kp} \leq \log_2\left(1 + \frac{|h_{k1}|^2 P_{kp}}{N_0 + |h_{k1}|^2 \sum_{j \neq k}^{N} P_{jp} + |h_{k2}|^2 P'_p}\right);$$

and the sixth condition met by the transmit rate for the codeword of the second information corresponding to the $s^{th}$ terminal of the other (N−1) terminals than the second terminal of the N terminals includes:

$$R_{sp} \leq \log_2\left(1 + \frac{|h_{s1}|^2 P_{sp}}{N_0 + |h_{s1}|^2 \sum_{j \neq s}^{N} P_{sp}}\right), \forall s = 1, \ldots k-1, k+1, N,$$

where $R_{IA}$ represents a transmit rate for the superposition of the codeword of the first information corresponding to the third terminal and the codeword of the first information corresponding to the fourth terminal; $h_{k1}$ represents a channel fading factor between the second terminal and the first base station; $P_{tc}$ represents the transmit rate for the codeword of the first information corresponding to the third terminal; $h_{k2}$ represents a channel fading factor between the fourth terminal and the second base station; P' represents a transmit power for the codeword of the second information corresponding to the fourth terminal; $N_0$ represents a local noise power; $P_{jp}$ represents the transmit power for the codeword of the second information corresponding to the $j^{th}$ terminal of the N terminals served by the first base station; $P_{jc}$ represents the transmit power for the codeword of the first information corresponding to the $j^{th}$ terminal; $R_{nc}$ represents the transmit rate for the codeword of the first information corresponding to the $n^{th}$ terminal of the (N−1) terminals, other than the third terminal, of the N terminals; $P_{nc}$ represents a transmit power for the codeword of the first information corresponding to the $n^{th}$ terminal; $h_{s1}$ represents a channel fading factor between the $s^{th}$ terminal of the other (N−1) terminals than the second terminal of the N terminals and the first base station; $R_{kp}$ represents the transmit rate for the codeword of the second information corresponding to the second terminal; $P_{kp}$ represents a transmit power for the codeword of the second information corresponding to the second terminal; $P_{sp}$ represents the transmit rate for the codeword of the second information corresponding to the $s^{th}$ terminal; and $\forall$ represents that the foregoing inequations are true for all values of variants, where a user k is the second terminal served by the first base station, and a user t is the third terminal served by the first base station.

With reference to the fourth possible implementation manner of the ninth aspect, in a fifth possible implementation manner of the ninth aspect, that a superposition of the codeword of the first information corresponding to the third terminal and a codeword of first information corresponding to the fourth terminal can be decoded correctly at a second terminal of the N terminals includes: smallest Euclidean distances $d_1$ and $d_2$ between constellation points in a constellation diagram used by a coding and modulating scheme CMS that is corresponding to the codeword of the first information corresponding to the third terminal and the codeword of the first information corresponding to the fourth terminal meet the following conditions respectively:

$$d_1 \geq 2\frac{\sqrt{N_0 + |h_{k1}|^2 \sum_{j \neq t} P_{jc} + |h_{k1}|^2 \sum_{j=1}^{N} P_{jp} + |h_{k2}|^2 P'_p}}{|h_{k1}|}, \text{ and}$$

$$d_2 \geq 2\frac{\sqrt{N_0 + |h_{k1}|^2 \sum_{j \neq t} P_{jc} + |h_{k1}|^2 \sum_{j=1}^{N} P_{jp} + |h_{k2}|^2 P'_p}}{|h_{k2}|};$$

and any constellation points $c_{kc}$ and $c_{tc}$ in the constellation diagram meet the following conditions: $h_{k1}c_{kc} \in \{Am: m \in Z^{2\times 1}\}$ and $h_{k2}c_{tc} \in \{Am:m \in Z^{2\times 1}\}$, where $A \in C^{1\times 2}$, A is a preset two-dimensional complex number vector, and $Z^{2\times 1}$ represents an integer column vector with two rows and one column.

According to a tenth aspect, a second base station is provided, where the second base station includes a transmitter and a processor. The transmitter is configured to: if there is interference from a first base station in a neighboring cell, transmit a superposition of a codeword of first information and a codeword of second information to a fourth terminal and a second terminal, where the first information and the second information are corresponding to the fourth terminal, the fourth terminal is an interference-aligned user terminal, and the second terminal is an edge user terminal served by the first base station. The codeword of the first information corresponding to the fourth terminal is obtained by the processor according to a transmit rate and a transmit power for the codeword of the first information corresponding to the fourth terminal, the codeword of the second information corresponding to the fourth terminal is obtained by the processor according to a transmit rate and a transmit power for the codeword of the second information corresponding to the fourth terminal, the transmit rate for the codeword of the first information corresponding to the fourth terminal meets a first condition, and a transmit rate for the second information corresponding to the fourth terminal meets a second condition, where the first condition is: when codewords of first information corresponding to (N−1) terminals, other than a third terminal, of N terminals served by the first base station, codewords of second information corresponding to the N terminals, and the codeword of the second information corresponding to the fourth terminal are regarded as noise, a superposition of a codeword of first information corresponding to the third terminal and the codeword of the first information corresponding to the fourth terminal can be decoded correctly at a second terminal of the N terminals, and when the codeword of the second information corresponding to the fourth terminal is regarded as noise, the first information corresponding to the fourth terminal can be decoded correctly at the fourth terminal; the second condition is that correct decoding can be performed at the fourth terminal; and the third terminal is an interference-aligned user terminal.

With reference to the tenth aspect, in a first possible implementation manner of the tenth aspect, the first information is information used by all terminals capable of receiving the first information, to perform joint detection, and the second information is information used by the terminal to perform single-user detection.

With reference to the first possible implementation manner of the tenth aspect, in a second possible implementation manner of the tenth aspect, the first condition met by the transmit rate for the codeword of the first information corresponding to the fourth terminal includes:

$$R_{IA} \leq \log_2\left(1 + \frac{|h_{k1}|^2 P_{tc} + |h_{k2}|^2 P'_c}{N_0 + |h_{k1}|^2 \sum_{j \neq t}^N P_{jc} + |h_{k1}|^2 \sum_{j=1}^N P_{jp} + |h_{k2}|^2 P'_p}\right), \text{ and}$$

$$R'_c \leq \log_2\left(1 + \frac{|h'|^2 P'_c}{N_0 + |h'|^2 P'_p}\right);$$

and the second condition met by the transmit rate for the second information corresponding to the fourth terminal includes:

$$R'_p \leq \log_2\left(1 + \frac{|h'|^2 P'_p}{N_0}\right),$$

where $R_c'$ represents the transmit rate for the codeword of the first information corresponding to the fourth terminal; $R_p'$ represents the transmit rate for the codeword of the second information corresponding to the fourth terminal; $R_{IA}$ represents a transmit rate for the superposition of the codeword of the first information corresponding to the third terminal and the codeword of the first information corresponding to the fourth terminal; $N_0$ represents a local noise power of the fourth terminal; $h_{k1}$ represents a channel fading factor between the second terminal and the first base station; $h_{k2}$ represents a channel fading factor between the second terminal and the second base station; h' represents a channel fading factor between the fourth terminal and the second base station; $P_{jp}$ represents a transmit power for a codeword of second information corresponding to the $j^{th}$ terminal of the N terminals served by the first base station; $P_{jc}$ represents a transmit power for a codeword of first information corresponding to the $j^{th}$ terminal; $P_p'$ represents the transmit power for the codeword of the second information corresponding to the fourth terminal; and $P_c'$ represents the transmit power for the codeword of the first information corresponding to the fourth terminal, where a user k is the second terminal served by the first base station, and a user t is the third terminal served by the first base station.

With reference to any one of the tenth aspect, the first possible implementation manner of the tenth aspect, or the second possible implementation manner of the tenth aspect, in a third possible implementation manner of the tenth aspect, that a superposition of a codeword of first information corresponding to the third terminal and the codeword of the first information corresponding to the fourth terminal can be decoded correctly at a second terminal of the N terminals includes: smallest Euclidean distances $d_1$ and $d_2$ between constellation points in a constellation diagram used by a coding and modulating scheme CMS that is corresponding to the codeword of the first information corresponding to the third terminal and the codeword of the first information corresponding to the fourth terminal meet the following conditions respectively:

$$d_1 \geq 2\frac{\sqrt{N_0 + |h_{k1}|^2 \sum_{j \neq t} P_{jc} + |h_{k1}|^2 \sum_{j=1}^N P_{jp} + |h_{k2}|^2 P'_p}}{|h_{k1}|}, \text{ and}$$

$$d_2 \geq 2\frac{\sqrt{N_0 + |h_{k1}|^2 \sum_{j \neq t} P_{jc} + |h_{k1}|^2 \sum_{j=1}^N P_{jp} + |h_{k2}|^2 P'_p}}{|h_{k2}|};$$

and any constellation points $c_{kc}$ and $c_{tc}$ in the constellation diagram meet the following conditions: $h_{k1}c_{kc} \in \{Am: m \in Z^{2\times 1}\}$ and $h_{k2}c_{tc} \in \{Am: m \in Z^{2\times 1}\}$, where a channel fading factor for a terminal is corresponding to the constellation point, $A \in C^{1\times 2}$, A is a preset two-dimensional complex number vector, and $Z^{2\times 1}$ represents an integer column vector with two rows and one column.

According to an eleventh aspect, a fifth terminal is provided, and applied to a cellular communications system, where channels between M first terminals and a first base station that are in the cellular communications system belong to a first channel, a channel between a second terminal and the first base station belongs to a second channel, and a channel fading factor of the first channel is greater than a channel fading factor of the second channel, where M≥1, and M is an integer; the fifth terminal is any terminal of the M first terminals or the second terminal; and the fifth terminal includes a processor, a transceiver, a memory, and a communications bus, where the communications bus is configured to implement a connection and communication between the processor, the transceiver, and the memory. The transceiver is configured to perform communication between the fifth terminal and the outside. The processor is configured to invoke program code stored in the memory to execute the method according to any item of the third aspect.

According to a twelfth aspect, a fourth terminal is provided, and applied to a cellular communications system, where the cellular communications system includes a first base station and a second base station, interference exists between the first base station and the second base station, and a center user terminal served by the second base station is the fourth terminal; and the fourth terminal includes: a processor, a transceiver, a memory, and a communications bus, where the communications bus is configured to implement a connection and communication between the processor, the transceiver, and the memory. The transceiver is configured to perform communication between the fourth terminal and the outside. The processor is configured to invoke program code stored in the memory to execute the method according to any item of the fourth aspect.

According to the downlink MA method, the base station, and the terminal that are provided in the embodiments of the present invention, a first base station transmits a superposition of a codeword of first information and a codeword of second information to N terminals, where the first information and the second information are corresponding to each terminal of the N terminals, a transmit rate for a codeword of first information corresponding to the $r^{th}$ terminal meets a first condition, and a transmit rate for a codeword of second information corresponding to the $r^{th}$ terminal meets a second condition. Therefore, it can be known that, in the embodiments of the present invention, a message partitioning mechanism is introduced, that is, the first base station partitions, by using the message partitioning mechanism, a message corresponding to each terminal into two parts: first information and second information; the transmit rate for the codeword of the first information corresponding to the $r^{th}$ terminal is related to transmit powers for codewords of second information corresponding to the N terminals; and the transmit rate for the codeword of the second information corresponding to the $r^{th}$ terminal is related to transmit powers for codewords of second information corresponding to the other (N−1) terminals. In this way, by controlling a transmit power for a codeword of first information and a transmit power for a codeword of second information, the first base station can flexibly adjust transmit rates of the N terminals that communicate with the first base station, where the first information and the second information are corresponding to each terminal of the N terminals, thereby implementing a flexible compromise on a transmit rate and fairness between different terminals that communicate with the base station. The first condition is: when the codewords of the second information corresponding to the N terminals are regarded as noise, the first information corresponding to the $r^{th}$ terminal can be decoded correctly at any terminal of the N terminals, and the second condition is: when the codewords of the second information corresponding to the other (N−1) terminals are regarded as noise, the second information corresponding to the $r^{th}$ terminal can be decoded correctly at the $r^{th}$ terminal, where $1 \leq r \leq N$.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 3 is a schematic flowchart of a downlink MA method according to an embodiment of the present invention;

FIG. 4 shows a model of a cellular system including two cells according to an embodiment of the present invention;

FIG. 5 is a schematic flowchart of a downlink MA method according to an embodiment of the present invention;

DETAILED DESCRIPTION OF ILLUSTRATIVE EMBODIMENTS

For ease of understanding, brief descriptions of an OMA technology are first provided.

In an example of uplink transmission on a two-user multiple access channel (MAC), two single-antenna UEs transmit messages to a single-antenna base station at a transmit power $P_i$, where $i=1, 2$. Messages to be transmitted by a terminal 1 and a terminal 2 are recorded as $m_1$ and $m_2$ respectively. A channel between the terminal 1 and the base station and a channel between the terminal 2 and the base station are flatly fading channels. Channel fading factors are $h_1$ and $h_2$ respectively. A local noise power of the base station is $N_0$. When there is no terminal 2/terminal 1, it can be known, according to Shannon's equation, that a maximum transmit power between the terminal 1/terminal 2 and the base station is $$R_i \leq \log_2\left(1 + \frac{|h_i|^2 P_i}{N_0}\right)$$

Figure 1:
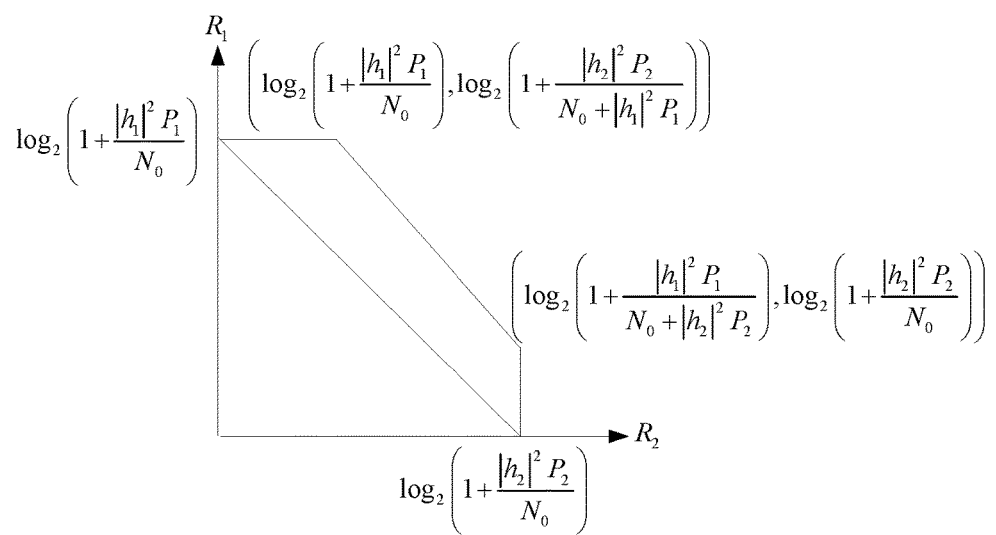
FIG. 1 is a schematic diagram of a comparison between sequence detection rate ranges in an OMA technology and an SC-SD mechanism according to an embodiment of the present invention.

(bit/symbol), where $i=1, 2$. If a resource is partitioned orthogonally between the two UEs, a total transmit rate of the two UEs is finally $R=aR_1+(1-a)R_2$, where $a$ represents a ratio of a spectrum resource allocated to the terminal 1 to all resources, and $a \in [0,1]$. That is, if $R_1$ serves as a vertical axis, and $R_2$ serves as a horizontal axis, as shown in FIG. 1, when orthogonal partition multiple access is used, a range of a reachable rate is a triangular area surrounded by sequentially connecting three points $(\log_2 (1+|h_1|^2 P_1/N_0), 0)$, $(0, \log_2 (1+|h_2|^2 P_2/N_0))$, and $(0,0)$.

However, in this scenario, a reachable transmit rate can be higher. A point-to-point channel capacity can be broken through completely by using an SC-SD mechanism. Herein, a procedure of the SC-SD mechanism is briefly described as follows with reference to a channel for two transmitters and one receiver in the foregoing OMA mechanism.

Superposition Coding.

The terminal 1 codes the message $m_1$ into a codeword $x_1$ with a transmit rate $R_1$ by using a reliable coding and modulating scheme (CMS) that is recorded as $CMS_1$, where $$R_1 \leq \log_2\left(1 + \frac{|h_1|^2 P_1}{N_0}\right).$$

The terminal 2 codes the message $m_2$ into a codeword $x_2$ with a rate $R_2$ for transmission by using a reliable CMS that is recorded as $CMS_2$, where $$R_2 \leq \log_2\left(1 + \frac{|h_2|^2 P_2}{N_0 + |h_1|^2 P_1}\right).$$

It should be noted that the reliable CMS refers to that, for a given channel condition and a given transmit rate, coding and modulating are performed at a transmit end by using the scheme, and detection is performed at a receive end by using a demodulating and decoding algorithm corresponding to the scheme, which can make an error rate randomly low; or if a CMS can make an error rate less than a preset threshold in an actual system, it may be deemed that the CMS is reliable.

Successive Decoding.

A signal received at the base station is obtained after signals from the two UEs and local noise are superposed, that is, $y = h_1 x_1 + h_2 x_2 + n$, where $h_1$ and $h_2$ represent the channel fading factor between the terminal 1 and the base station and the channel fading factor between the terminal 2 and the base station respectively, $x_1$ represents the codeword of the message $m_1$, $x_2$ represents the codeword of the message $m_2$, and n represents the local noise.

The base station performs detection by using the following steps.

Step 1: The base station regards $x_1$ as noise, detects $m_2$ from y by using a demodulating and decoding scheme (DDS) that is corresponding to $CMS_2$ and that is recorded as $DDS_2$, and records a detection result as $\hat{m}_2$.

Step 2: The base station recodes $\hat{m}_2$ by using $CMS_2$, to obtain an estimation value $\hat{x}_2$ of $x_2$; reconstructs $h_2 \hat{x}_2$ according to $h_2$; and subtracts $h_2 \hat{x}_2$ from y to obtain $y' = y - h_2 \hat{x}_2$.

Step 3: The base station detects $m_1$ from $y'$ by using a DDS that is corresponding to $CMS_1$ and that is recorded as $DDS_1$, and records a detection result as $\hat{m}_1$. So far, the base station has completed detection on the messages transmitted by the two UEs.

Result verification is as follows.

In step 1, the base station regards $x_1$ as the noise; in this case, it can be known that a power of equivalent noise $h_1 x_1 + n$ is $N_0 + |h_1|^2 P$. Through such equivalence, the original MAC is transformed into a point-to-point Gaussian channel, it can be known, according to Shannon's equation, that a capacity of the channel is $$\log_2\left(1 + \frac{|h_2|^2 P_2}{N_0 + |h_1|^2 P_1}\right),$$

and it can be known, according to a condition, that in this case, $R_2$ meets the capacity of the channel and that $CMS_2$ is reliable. Therefore, $m_2$ can be detected correctly.

Then, the base station reconstructs $h_2 \hat{x}_2$ and subtracts $h_2 \hat{x}_2$ from y; in this case, $y' = h_1 x_1 + n + h_2 (x_2 - \hat{x}_2)$, where a final item represents an error introduced in a detection, reconstruction, and interference removal process in step 1. Apparently, when correct decoding is performed, this item is 0. That is, the message from the terminal 2 is completely removed. If the message from the terminal 2 is completely removed, the channel between the base station and the terminal 1 is transformed into a point-to-point Gaussian channel. It can be known that a capacity of the channel is $$\log_2\left(1 + \frac{|h_1|^2 P_1}{N_0}\right).$$

Similarly, it can be known that in this case, $R_1$ meets the capacity of the channel, $CMS_1$ is reliable, and $m_1$ can be decoded correctly.

According to the foregoing receiving and transmitting policies, an obtained transmit rate is:

$$(R_1, R_2) = \left(\log_2\left(1 + \frac{|h_1|^2 P_1}{N_0}\right), \log_2\left(1 + \frac{|h_2|^2 P_2}{N_0 + |h_1|^2 P_1}\right)\right).$$

After exchanging locations of the terminal 1 and the terminal 2 in the foregoing procedure, the following can be obtained as well by using a similar method:

$$(R_1, R_2) = \left(\log_2\left(1 + \frac{|h_1|^2 P_1}{N_0 + |h_2|^2 P_2}\right), \log_2\left(1 + \frac{|h_2|^2 P_2}{N_0}\right)\right).$$

In conclusion, according to the foregoing SC-SD process, a range of a reachable rate is a chamfered pentagonal area surrounded by connecting five points (0,0), $$\left(\log_2\left(1 + \frac{|h_1|^2 P_1}{N_0}\right), \log_2\left(1 + \frac{|h_2|^2 P_2}{N_0 + |h_1|^2 P_1}\right)\right),$$

$$\left(\log_2\left(1 + \frac{|h_1|^2 P_1}{N_0 + |h_2|^2 P_2}\right), \log_2\left(1 + \frac{|h_2|^2 P_2}{N_0}\right)\right),$$

$$\left(\log_2\left(1 + \frac{|h_1|^2 P_1}{N_0}\right), 0\right), \text{ and } \left(0, \log_2\left(1 + \frac{|h_2|^2 P_2}{N_0}\right)\right),$$

as shown in FIG. 1.

Apparently, it can be known, from FIG. 1, that the transmit rate that can be reached in the SC-SD mechanism is strictly higher than that in an OMA mechanism. Actually, it can be proved, through analysis, that an increase in a receive power difference $||h_1|^2 P - |h_2|^2 P|$ between the two UEs results in a larger rate gain in the SC-SD relative to orthogonal partition.

Researches on an information theory further indicate that a range of a rate reached in the SC-SD mechanism is just a capacity range of the MAC, that is, in the MAC, the SC-SD mechanism is optimal.

Inspired by the foregoing SC-SD mechanism, DoCoMo proposes a multiple access technology named NOMA. The technology is completely the same as the foregoing SC-SD mechanism during uplink, and therefore, no details are repeated. A downlink case is briefly described as follows.

Figure 2:
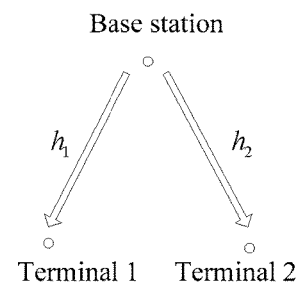
FIG. 2 shows a model of a two-user degraded broadcast channel according to an embodiment of the present invention.

A dual channel of the foregoing two-user MAC, that is, a two-user degraded broadcast channel (DBC) is used as an example for description, and the channel is shown in FIG. 2. On the channel, a single-antenna base station transmits corresponding messages to a terminal 1 and a terminal 2 at powers $P_1$ and $P_2$ respectively. It is assumed that the messages to be transmitted by the base station to the terminal 1 and the terminal 2 are $m_1$ and $m_2$ respectively. A channel between the base station and the terminal 1 and a channel between the base station and the terminal 2 are flat fading channels, and channel fading factors are $h_1$ and $h_2$ respectively. Either of local noise powers of the two UEs is $N_0$. Receiving and transmitting policies in the NOMA technology are as follows.

Transmit-End Processing.

The base station codes the message $m_1$ into a codeword $x_1$ with a rate $R_1$ by using a reliable CMS that is recorded as $CMS_1$, where $$R_1 \leq \log_2\left(1 + \frac{|h_1|^2 P_1}{N_0 + |h_1|^2 P_2}\right);$$

and codes the message $m_2$ into a codeword $x_2$ with a rate $R_2$ by using a reliable CMS that is recorded as $CMS_2$, where $$R_2 \leq \log_2\left(1 + \frac{|h_2|^2 P_2}{N_0}\right).$$

The base station uses a superposition $x_1+x_2$ of the two codewords as a to-be-sent signal for transmission.

Receive-end processing: The following describes receiving policies of the terminal 1 and the terminal 2 separately.

Terminal 1: A signal received by the terminal 1 is $y_1=h_1(x_1+x_2)+n_1$, where $h_1$ represents the channel fading factor between the terminal 1 and the base station, $x_1$ represents the codeword of the message $m_1$, $x_2$ represents the codeword of the message $m_2$, and $n_1$ represents local noise of the terminal 1.

A detection procedure of the terminal 1 is as follows.

The terminal 1 regards $x_2$ as noise, detects $m_1$ from $y_1$ by using a DDS that is corresponding to $CMS_1$ and that is recorded as $DDS_1$, and records a detection result as $\hat{m}_1$.

Terminal 2: A signal received by the terminal 2 is $y_2=h_2(x_1+x_2)+n_2$ where $h_2$ represents the channel fading factor between the terminal 2 and the base station, $x_1$ represents the codeword of the message $m_1$, $x_2$ represents the codeword of the message $m_2$, and $n_2$ represents local noise of the terminal 2.

A detection procedure of the terminal 2 is as follows.

Step 1: The terminal 2 first regards $x_2$ as noise, detects $m_1$ from $y_2$ by using $DDS_1$, and records a detection result as $\hat{m}_1$.

Step 2: The terminal 2 recodes $\hat{m}_1$ by using $CMS_1$, to obtain an estimation value $\hat{x}_1$ of $x_1$; reconstructs $h_2\hat{x}_1$ according to $h_2$; and subtracts $h_2\hat{x}_1$ from $y_2$ to obtain $y_2'=y_2-h_2\hat{x}_2$.

Step 3: The terminal 2 detects $m_2$ from $y_2'$ by using a DDS that is corresponding to $CMS_2$ and that is recorded as $DDS_2$, and records a detection result as $\hat{m}_2$.

Result verification is as follows.

$\hat{m}_1$ needs to be detected from $y_2$ before $\hat{m}_2$ is detected at the terminal 2, and during detection of $m_1$, $x_2$ is regarded as noise. In this case, the DBC is equivalent to a Gaussian channel with a noise power of $N_0+|h_2|^2 P_2$, of which a capacity is $$\log_2\left(1 + \frac{|h_2|^2 P_1}{N_0 + |h_2|^2 P_2}\right).$$

However, a limitation imposed on $R_1$ above is $$R_1 \leq \log_2\left(1 + \frac{|h_1|^2 P_1}{N_0 + |h_1|^2 P_2}\right).$$

Therefore, if $R_1$ meets the limitation condition, $|h_1| \leq |h_2|$ is required; if $|h_1| > |h_2|$, it means that $$\log_2\left(1 + \frac{|h_2|^2 P_1}{N_0 + |h_2|^2 P_2}\right) =$$

$$\log_2\left(1 + \frac{|h_1|^2 P_1}{\frac{|h_1|^2}{|h_2|^2} N_0 + |h_1|^2 P_2}\right) < \log_2\left(1 + \frac{|h_1|^2 P_1}{N_0 + |h_1|^2 P_2}\right).$$

Apparently, when $$\log_2\left(1 + \frac{|h_2|^2 P_1}{N_0 + |h_2|^2 P_2}\right) < R_1 \leq \log_2\left(1 + \frac{|h_1|^2 P_1}{N_0 + |h_1|^2 P_2}\right),$$

$m_1$ cannot be detected correctly at the terminal 2. Wrong decoding results in error propagation inevitably. In this case, $m_2$ cannot be detected correctly.

Therefore, it can be seen that in the NOMA technology, a UE detection sequence is specified, that is, a UE under a worse channel condition needs to be detected first, and then a UE under a better channel condition is detected.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

This embodiment of the present invention provides a downlink MA method. Specifically, as shown in FIG. 3, the method includes the following steps.

301: A first base station transmits a superposition of a codeword of first information and a codeword of second information to N terminals, where the first information and the second information are corresponding to each terminal of the N terminals, and N is a positive integer.

A codeword of first information corresponding to the $r^{th}$ terminal is obtained according to a transmit rate and a transmit power for the codeword of the first information corresponding to the $r^{th}$ terminal, a codeword of second information corresponding to the $r^{th}$ terminal is obtained according to a transmit rate and a transmit power for the codeword of the second information corresponding to the $r^{th}$ terminal, the transmit rate for the codeword of the first information corresponding to the $r^{th}$ terminal meets a first condition, and the transmit rate for the codeword of the second information corresponding to the $r^{th}$ terminal meets a second condition, where the first condition is: when codewords of second information corresponding to the N terminals are regarded as noise, the first information corresponding to the $r^{th}$ terminal can be decoded correctly at any terminal of the N terminals; the second condition is: when codewords of second information corresponding to the other (N−1) terminals are regarded as noise, the second information corresponding to the $r^{th}$ terminal can be decoded correctly at the $r^{th}$ terminal; and $1 \leq r \leq N$.

Specifically, in this embodiment of the present invention, a message corresponding to each terminal is partitioned into two parts: first information and second information. Either part of information may be detected in a different detection manner.

Preferably, the first information is information used by all terminals capable of receiving the first information, to perform joint detection, and the second information is information used by the terminal to perform single-user detection.

Exemplarily, messages $m_i$ corresponding to the N terminals are each partitioned into two parts: $m_{ip}$ and $m_{ic}$, where $i=1, 2, \ldots, N$; $m_{ic}$ is referred to as the first information, and this part of information needs to be decoded in a detection manner in SD and at all terminals capable of receiving the information; and $m_{ip}$ is referred to as second information, and this part of information may be decoded in a traditional single-user detection manner at a corresponding receive end, that is, a terminal i corresponding to the second information, and be equivalent to noise at a non-corresponding receiving terminal.

Particularly, assuming that a channel fading factor between the $k^{th}$ terminal and the first base station is worst, it may be particularly defined that $m_{kc}=m_k$, that is, the entire $m_k$ is used as the first information, and the second information is 0. In this case, the first information needs to be decoded in the detection manner in SD and at all terminals capable of receiving the first information. In addition, because the first information corresponding to the $k^{th}$ terminal is finally detected in a detection sequence in SD in this solution, the $k^{th}$ terminal can obtain a higher SINR, thereby increasing a transmit rate between the first base station and the terminal.

Further, if the detection sequence in SD is the $1^{st}$ terminal, the $2^{nd}$ terminal, ..., and the $N^{th}$ terminal, the second condition met by the transmit rate for the codeword of the second information corresponding to the $r^{th}$ terminal may be specifically shown in formula (1):

$$R_{rp} \leq \log_2\left(1 + \frac{|h_r|^2 P_{rp}}{N_0 + |h_r|^2 \sum_{j \neq r} P_{rp}}\right), \forall r = 1, 2, \ldots, N; \quad \text{formula (1)}$$

and the first condition met by the transmit rate for the codeword of the first information corresponding to the $r^{th}$ terminal may be specifically shown in formula (2):

$$R_{rc} \leq \log_2\left(1 + \frac{|h_m|^2 P_{rc}}{N_0 + |h_m|^2 \sum_r P_{rp} + |h_m|^2 \sum_{j=r+1}^{N} P_{jc}}\right), \quad \text{formula (2)}$$

$$\forall m, r = 1, 2, \ldots N,$$

where $R_{rp}$ represents the transmit rate for the codeword of the second information corresponding to the $r^{th}$ terminal; $R_{rc}$ represents the transmit rate for the codeword of the first information corresponding to the $r^{th}$ terminal; $N_0$ represents a local noise power of the $r^{th}$ terminal; $h_r$ represents a channel fading factor between the $r^{th}$ terminal and the first base station; $P_{rp}$ represents the transmit power for the codeword of the second information corresponding to the $r^{th}$ terminal; $P_{jp}$ represents a transmit power for a codeword of second information corresponding to the $j^{th}$ terminal; $h_m$ represents a channel fading factor between the $m^{th}$ terminal and the first base station; $P_{jc}$ represents a transmit power for a codeword of first information corresponding to the $j^{th}$ terminal; $P_{rc}$ represents the transmit power for the codeword of the first information corresponding to the $r^{th}$ terminal; and $\forall$ represents that the foregoing inequations are true for all values of variants. Exemplarily, in formula (2), when $r=1$, there are a total of N values $1, 2, \ldots,$ and N for m, that is, there is one corresponding formula for all receiving terminals. This means that $R_{1c}$ still meets the condition at a terminal that is under a worst channel condition.

It should be noted that the first base station may separately code, by using a reliable CMS, the first information and the second information that are corresponding to the N terminals, and further obtain codewords of the first information corresponding to the N terminals and codewords of the second information corresponding to the N terminals. For related descriptions of the "reliable CMS", refer to the descriptions in the preface of DESCRIPTION OF EMBODIMENTS, and no details are repeated herein in this embodiment of the present invention. The codeword of the first information corresponding to the $r^{th}$ terminal is obtained according to the transmit rate and the transmit power for the codeword of the first information corresponding to the $r^{th}$ terminal, and the codeword of the second information corresponding to the $r^{th}$ terminal is obtained according to the transmit rate and the transmit power for the codeword of the second information corresponding to the $r^{th}$ terminal.

Exemplarily, the first base station may code first information $m_{1c}$ corresponding to the $1^{st}$ terminal into a codeword $x_{1c}$ with a transmit rate $R_{1c}$ and a transmit power $P_{1c}$ by using a reliable CMS that is recorded as $CMS_{1c}$, where $R_{1c}$ meets $$R_{1c} \leq \log_2\left(1 + \frac{|h_m|^2 P_{1c}}{N_0 + |h_m|^2 \sum_i P_{ip} + |h_m|^2 \sum_{j=2}^{N} P_{jc}}\right), \forall m = 1, 2, \ldots N.$$

In an example of the DBC (N=2) shown in FIG. 2, expositions of an entire process of the downlink MA method on a side of the first base station provided in this embodiment of the present invention are provided in the following.

In the system, in order not to lose generality, it is assumed that $|h_1| \geq |h_2|$, first information corresponding to a terminal 1 is recorded as $m_{1c}$, second information corresponding to the terminal 1 is recorded as $m_{1p}$, first information corresponding to a terminal 2 is recorded as $m_{2c}$, and second information corresponding to the terminal 2 is recorded as $m_{2p}$. Particularly, if $m_{2c}=m_2$, the first information is information used by all terminals capable of receiving the first information, to perform joint detection, and the second information is information used by the terminal to perform single-user detection.

Step 1: A base station determines, according to formula (1), that a transmit power for a codeword $x_{1p}$ of the second information corresponding to the terminal 1 is $P_{1p}$ and that a transmit rate $R_{1p}$ meets $$R_{1p} \le \log_2\left(1 + \frac{|h_1|^2 P_{1p}}{N_0}\right);$$

and determines that both a transmit power and a transmit rate for a codeword $x_{2p}$ of the second information corresponding to the terminal 2 are 0; and the base station determines, according to formula (2), that a transmit power for a codeword $x_{2c}$ of the first information corresponding to the terminal 2 is $P_{2c}$ and that a transmit rate $R_{2c}$ meets $$R_{2c} \le \log_2\left(1 + \frac{|h_2|^2 P_{2c}}{N_0 + |h_2|^2 P_{1p}}\right);$$

and determines that a transmit power for a codeword $x_{1c}$ of the first information corresponding to the terminal 1 is $P_{1c}$ and that a transmit rate $R_{1c}$ meets $$R_{1c} \le \log_2\left(1 + \frac{|h_2|^2 P_{1c}}{N_0 + |h_2|^2 (P_{2c} + P_{1p})}\right).$$

Step 2: The base station codes $m_{1p}$ into the codeword $x_{1p}$ with the transmit rate $R_{1p}$ and the transmit power $P_{1p}$ by using a reliable CMS that is recorded as $CMS_{1p}$, where $R_{1p}$ meets $$R_{1p} \le \log_2\left(1 + \frac{|h_1|^2 P_p}{N_0}\right);$$

the base station codes $m_{2c}$ into the codeword $x_{2c}$ with the transmit rate $R_{2c}$ and the transmit power $P_{2c}$ by using a reliable CMS that is recorded as $CMS_{2c}$, where $R_{2c}$ meets $$R_{2c} \le \log_2\left(1 + \frac{|h_2|^2 P_{2c}}{N_0 + |h_2|^2 P_{1p}}\right);$$

and the base station codes $m_{1c}$ into the codeword $x_{1c}$ with the transmit rate $R_{1c}$ and the transmit power $P_{1c}$ by using a reliable CMS recorded as $CMS_{1c}$, where $R_{1c}$ meets $$R_{1c} \le \log_2\left(1 + \frac{|h_2|^2 P_{1c}}{N_0 + |h_2|^2 (P_{2c} + P_{1p})}\right).$$

Step 3: The base station superposes $x_{1c}$, $x_{1p}$, and $x_{2c}$, and then transmits a superposition to the terminal 1 and the terminal 2, that is, a signal transmitted by the base station is $x = x_{1c} + x_{2c} + x_{1p}$.

It should be noted that the sum of the transmit powers of the three codewords shall be not greater than a maximum transmit power of the base station, that is, a restriction relationship $P_{1p} + P_{1c} + P_{2c} \le P$ shall be met, where P is the maximum transmit power of the base station.

In this case, a total transmit rate for the signal transmitted by the base station is:

$$\max(R_{1c} + R_{1p} + R_{2c}) = \log_2\left(1 + \frac{|h_2|^2 P_{1c}}{N_0 + |h_2|^2 (P_{2c} + P_{1p})}\right) +$$
$$\log_2\left(1 + \frac{|h_1|^2 P_{1p}}{N_0}\right) + \log_2\left(1 + \frac{|h_2|^2 P_{2c}}{N_0 + |h_2|^2 P_{1p}}\right)$$
$$= \log_2\left(1 + \frac{|h_1|^2 P_{1p}}{N_0}\right) + \log_2\left(1 + \frac{|h_2|^2 (P_{2c} + P_{1c})}{N_0 + |h_2|^2 P_{1p}}\right).$$

In comparison with the NOMA solution in the preface of DESCRIPTION OF EMBODIMENTS, it can be seen that if $P_{1c}=0$, that is, the entire $m_1$ serves as the second information, technical solutions in this example and in the prior art are completely the same, and reached total transmit rates are also completely the same. That is, the NOMA technology may be regarded as a special case of this technical solution. A message partitioning mechanism is introduced in this embodiment of the present invention; therefore, adjustment may be performed between a transmit rate of the terminal 1 and a transmit rate of the terminal 2, so as to achieve a flexible compromise on the transmit rates and fairness between the terminal 1 and the terminal 2. For example, if the transmit rate of the terminal 2 is intended to be increased, $P_{1p}$ is reduced and $P_{1c}$ is increased without changing a transmit power value of a message corresponding to each terminal. That is, an effect of increasing a transmit rate on a channel on which the terminal 2 is located can be achieved by reducing a ratio of the transmit power for the second information corresponding to the terminal 1 to the transmit power for the message corresponding to the terminal 1.

Based on the downlink MA method provided in the foregoing embodiment of the present invention, a first base station transmits a superposition of a codeword of first information and a codeword of second information to N terminals, where the first information and the second information are corresponding to each terminal of the N terminals, a transmit rate for a codeword of first information corresponding to the $r^{th}$ terminal meets a first condition, and a transmit rate for a codeword of second information corresponding to the $r^{th}$ terminal meets a second condition. Therefore, it can be known that, in this embodiment of the present invention, a message partitioning mechanism is introduced, that is, the first base station partitions, by using the message partitioning mechanism, a message corresponding to each terminal into two parts: first information and second information; the transmit rate for the codeword of the first information corresponding to the $r^{th}$ terminal is related to transmit powers for codewords of second information corresponding to the N terminals; and the transmit rate for the codeword of the second information corresponding to the $r^{th}$ terminal is related to transmit powers for codewords of second information corresponding to the other (N−1) terminals. In this way, by controlling a transmit power for a codeword of first information and a transmit power for a codeword of second information, the first base station may flexibly adjust transmit rates of the N terminals that communicate with the first base station, where the first information and the second information are corresponding to each terminal of the N terminals, thereby implementing a flexible compromise on a transmit rate and fairness between different terminals that communicate with the base station. The first condition is: when the codewords of the second information corresponding to the N terminals are regarded as noise, the first information corresponding to the $r^{th}$ terminal can be decoded correctly at any terminal of the N terminals, and the second condition is: when the codewords of the second information corresponding to the other (N−1) terminals are regarded as noise, the second information corresponding to the $r^{th}$ terminal can be decoded correctly at the $r^{th}$ terminal, where 1≤r≤N.

Further, interference is not considered in the NOMA mechanism. However, in an actual wireless communications system, because a medium may be used for both receiving and transmission that are performed without coordination, interference is caused and becomes another destructive factor than noise. In addition, as a radius of a cell in a cellular communications system decreases continuously, interference becomes increasingly severe and has replaced noise to become a major factor that restricts performance. If interference is not considered in the NOMA mechanism, when interference exists, an SINR at a receive end is reduced; as a result, a transmitted signal cannot be detected. Therefore, in the downlink MA method provided in this embodiment of the present invention, if there is interference from a second base station in a neighboring cell, the first condition met by the transmit rate for the codeword of the first information corresponding to the $r^{th}$ terminal may specifically include: a transmit rate for a codeword of first information corresponding to a third terminal of the N terminals meets a third condition, and a transmit rate for a codeword of first information corresponding to the $n^{th}$ terminal of (N−1) terminals, other than the third terminal, of the N terminals meets a fourth condition, where the third condition is: when codewords of first information corresponding to the (N−1) terminals, other than the third terminal, of the N terminals, the codewords of the second information corresponding to the N terminals, and a codeword of second information corresponding to a fourth terminal served by the second base station are regarded as noise, a superposition of the codeword of the first information corresponding to the third terminal and a codeword of first information corresponding to the fourth terminal can be decoded correctly at a second terminal of the N terminals, where the second terminal is an edge user terminal served by the first base station, and the third terminal and the fourth terminal are interference-aligned user terminals; and the fourth condition is: when the codewords of the second information corresponding to the N terminals and the codeword of the second information corresponding to the fourth terminal served by the second base station are regarded as noise, the first information corresponding to the $n^{th}$ terminal can be decoded correctly at the second terminal, and when the codewords of the second information corresponding to the N terminals are regarded as noise, the first information corresponding to the $n^{th}$ terminal can be decoded correctly at any terminal of (N−1) terminals, other than the second terminal, of the N terminals; and the second condition met by the transmit rate for the codeword of the second information corresponding to the $r^{th}$ terminal may specifically include: a transmit rate for a codeword of second information corresponding to the second terminal of the N terminals meets a fifth condition, and a transmit rate for a codeword of second information corresponding to the $s^{th}$ terminal of the other (N−1) terminals than the second terminal of the N terminals meets a sixth condition, where the fifth condition is: when codewords of second information corresponding to the other (N−1) terminals than the second terminal of the N terminals and the codeword of the second information corresponding to the fourth terminal served by the second base station are regarded as noise, the second information corresponding to the second terminal can be decoded correctly at the second terminal; and the sixth condition is: when codewords of second information corresponding to the (N−1) terminals, other than the $s^{th}$ terminal, of the N terminals is regarded as noise, the second information corresponding to the $s^{th}$ terminal can be decoded correctly at the $s^{th}$ terminal.

Particularly, if the detection sequence in SD is the $1^{st}$ terminal, the $2^{nd}$ terminal, . . . , and the $N^{th}$ terminal, the third condition met by the transmit rate for the codeword of the first information corresponding to the third terminal of the N terminals may be specifically shown in formula (3):

$$R_{IA} \leq \log_2 \left( 1 + \frac{|h_{k1}|^2 P_{tc} + |h_{k2}|^2 P'_c}{N_0 + |h_{k1}|^2 \sum_{j\neq t}^{N} P_{jc} + |h_{k1}|^2 \sum_{j=1}^{N} P_{jp} + |h_{k2}|^2 P'_p} \right); \quad \text{formula (3)}$$

the fourth condition met by the transmit rate for the codeword of the first information corresponding to the $n^{th}$ terminal of the (N−1) terminals, other than the third terminal, of the N terminals may be specifically shown in formula (4) and formula (5):

$$R_{nc} \leq \log_2 \left( 1 + \frac{|h_{k1}|^2 P_{nc}}{N_0 + |h_{k1}|^2 \sum_{\substack{j=n+1 \\ j\neq t}}^{N} P_{jc} + |h_{k1}|^2 \sum_{j=1}^{N} P_{jp} + |h_{k2}|^2 P'_p} \right), \quad \text{formula (4)}$$

$$\forall n = 1, \ldots, t-1, t+1, N, \text{ and}$$

$$R_{nc} \leq \log_2 \left( 1 + \frac{|h_{s1}|^2 P_{nc}}{N_0 + |h_{s1}|^2 \sum_{j=n+1}^{N} P_{jc} + |h_{s1}|^2 \sum_{j=1}^{N} P_{jp}} \right), \quad \text{formula (5)}$$

$$\forall n = 1, \ldots, t-1, t+1, \ldots, N;$$
$$\forall s = 1, \ldots, k-1, k+1, \ldots, N;$$

the fifth condition met by the transmit rate for the codeword of the second information corresponding to the second terminal of the N terminals may be specifically shown in formula (6):

$$R_{kp} \leq \log_2 \left( 1 + \frac{|h_{k1}|^2 P_{kp}}{N_0 + |h_{k1}|^2 \sum_{j\neq k} P_{jp} + |h_{k2}|^2 P'_p} \right); \quad \text{formula (6)}$$

and the sixth condition met by the transmit rate for the codeword of the second information corresponding to the $s^{th}$ terminal of the other (N−1) terminals than the second terminal of the N terminals may be specifically shown in formula (7):

$$R_{sp} \leq \log_2 \left( 1 + \frac{|h_{s1}|^2 P_{sp}}{N_0 + |h_{s1}|^2 \sum_{j\neq s} P_{sp}} \right), \forall s = 1, \ldots k-1, k+1, N, \quad \text{formula (7)}$$

where $R_{IA}$ represents a transmit rate for the superposition of the codeword of the first information corresponding to the third terminal and the codeword of the first information corresponding to the fourth terminal; $h_{k1}$ represents a channel fading factor between the second terminal and the first base station; $P_{tc}$ represents the transmit rate for the codeword of the first information corresponding to the third terminal; $h_{k2}$ represents a channel fading factor between the fourth terminal and the second base station; $P'$ represents a transmit power for the codeword of the second information corresponding to the fourth terminal; $N_0$ represents a local noise power; $P_{jp}$ represents the transmit power for the codeword of the second information corresponding to the $j^{th}$ terminal of the N terminals served by the first base station; $P_{jc}$ represents the transmit power for the codeword of the first information corresponding to the $j^{th}$ terminal; $R_{nc}$ represents the transmit rate for the codeword of the first information corresponding to the $n^{th}$ terminal of the (N−1) terminals, other than the third terminal, of the N terminals; $P_{nc}$ represents a transmit power for the codeword of the first information corresponding to the $n^{th}$ terminal; $h_{s1}$ represents a channel fading factor between the $s^{th}$ terminal of the other (N−1) terminals than the second terminal of the N terminals and the first base station; $R_{kp}$ represents the transmit rate for the codeword of the second information corresponding to the second terminal; $P_{kp}$ represents a transmit power for the codeword of the second information corresponding to the second terminal; $P_{sp}$ represents the transmit rate for the codeword of the second information corresponding to the $s^{th}$ terminal; and ∀ represents that the foregoing inequations are true for all values of variants, where a user k is the second terminal served by the first base station, and a user t is the third terminal served by the first base station.

Preferably, that a superposition of the codeword of the first information corresponding to the third terminal and a codeword of first information corresponding to the fourth terminal can be decoded correctly at a second terminal of the N terminals may specifically include: smallest Euclidean distances $d_1$ and $d_2$ between constellation points in a constellation diagram used by a coding and modulating scheme CMS that is corresponding to the codeword of the first information corresponding to the third terminal and the codeword of the first information corresponding to the fourth terminal meet formula (8) and formula (9) respectively:

$$d_1 \geq 2 \frac{\sqrt{N_0 + |h_{k1}|^2 \sum_{j \neq t} P_{jc} + |h_{k1}|^2 \sum_{j=1}^{N} P_{jp} + |h_{k2}|^2 P'_p}}{|h_{k1}|}, \text{ and} \quad \text{formula (8)}$$

$$d_2 \geq 2 \frac{\sqrt{N_0 + |h_{k1}|^2 \sum_{j \neq t} P_{jc} + |h_{k1}|^2 \sum_{j=1}^{N} P_{jp} + |h_{k2}|^2 P'_p}}{|h_{k2}|}; \quad \text{formula (9)}$$

and any constellation points $c_{kc}$ and $c_{tc}$ in the constellation diagram meet the following conditions: $h_{k1}c_{kc} \in \{Am: m \in Z^{2 \times 1}\}$ and $h_{k2}c_{tc} \in \{Am: m \in Z^{2 \times 1}\}$, where for meanings represented by the symbols in formula (8) and formula (9), refer to the meanings represented by the symbols in formula (3) to formula (7), and no details are repeated herein; and $A \in C^{1 \times 2}$, A is a preset two-dimensional complex number vector, and $Z^{2 \times 1}$ represents an integer column vector with two rows and one column.

In an example of a cellular system that includes two cells and that is shown in FIG. 4, expositions of an entire process of the downlink MA method on the side of the first base station provided in this embodiment of the present invention are provided in the following. In the system, a base station 1 transmits messages to a terminal 1 and a terminal 2, and a base station 2 transmits a message to a terminal 3, where the terminal 1 and the terminal 3 are center user terminals, and the terminal 2 is an edge user terminal. It may be deemed that for the center user terminals, a signal from a neighboring cell has been attenuated to a negligible degree. A channel fading factor between the base station 1 and the terminal 1 and a channel fading factor between the base station 1 and the terminal 2 are recorded as $h_{11}$ and $h_{21}$ respectively, and a channel fading factor between the base station 2 and the terminal 2 and a channel fading factor between the base station 2 and the terminal 3 are recorded as $h_{22}$ and $h_{32}$ respectively. In order not to lose generality, it is assumed that $|h_{11}| > |h_{21}|$, $|h_{22}| > |h_{32}|$, first information corresponding to the terminal 1 is recorded as $m_{1c}$, second information corresponding to the terminal 1 is recorded as $m_{1p}$, first information corresponding to the terminal 2 is recorded as $m_{2c}$, and second information corresponding to the terminal 2 is recorded as $m_{2p}$. Particularly, if $m_{2c}=m_2$, the first information is information used by all terminals capable of receiving the first information, to perform joint detection, and the second information is information used by the terminal to perform single-user detection.

Step 1: The base station 1 determines, according to formula (4) and formula (5), that a transmit power for a codeword of the first information corresponding to the terminal 2 is $P_{2c}$ and that a transmit rate $R_{2c}$ meets $$R_{2c} \leq \log_2 \left(1 + \frac{|h_{21}|^2 P_{2c}}{N_0 + |h_{21}|^2 P_{1p} + |h_{22}|^2 P_{3p}}\right);$$

and determines, according to formula (3), that a transmit power for a codeword of the first information corresponding to the terminal 1 is $P_{1c}$ and that a transmit rate $R_{1c}$ meets $$R_{1c} \leq \log_2 \left(1 + \frac{|h_{21}|^2 P_{1c}}{N_0 + |h_{21}|^2 (P_{1p} + P_{2c}) + |h_{22}|^2 P_{3p}}\right);$$

and the base station 1 determines, according to formula (7), that a transmit power for a codeword of the second information corresponding to the terminal 1 is $P_{1p}$ and that a transmit rate $R_{1p}$ meets $$R_{1c} \leq \log_2 \left(1 + \frac{|h_{11}|^2 P_{1p}}{N_0}\right);$$

and determines, according to formula (6), that both a transmit power and a transmit rate $R_{2c}$ for a codeword of the second information corresponding to the terminal 2 are 0.

Step 2: The base station 1 codes $m_{1p}$ into a codeword $x_{1p}$ with the transmit rate $R_{1p}$ and the transmit power $P_{1p}$ by using a reliable CMS that is recorded as $CMS_{1p}$, where $R_{1p}$ meets $$R_{1p} \leq \log_2 \left(1 + \frac{|h_{11}|^2 P_{1p}}{N_0}\right);$$

the base station 1 codes $m_{2c}$ into a codeword $x_{2c}$ with the transmit rate $R_{2c}$ and the transmit power $P_{2c}$ by using a reliable CMS that is recorded as $CMS_{2c}$, where $R_{2c}$ meets $$R_{2c} \leq \log_2\left(1 + \frac{|h_{21}|^2 P_{2c}}{N_0 + |h_{21}|^2 P_{1p} + |h_{22}|^2 P_{3p}}\right);$$

and the base station 1 codes $m_{1c}$ into a codeword $x_{1c}$ with the transmit rate $R_{1c}$ and the transmit power $P_{1c}$ by using a reliable CMS recorded as $CMS_{1c}$, where $R_{1c}$ meets $$R_{1c} \leq \log_2\left(1 + \frac{|h_{21}|^2 P_{1c}}{N_0 + |h_{21}|^2 (P_{1p} + P_{2c}) + |h_{22}|^2 P_{3p}}\right).$$

In addition, the following special requirements are raised on $CMS_{1c}$ and $CMS_{3c}$:

1: Smallest Euclidean distances $d_1$ and $d_2$ between constellation points in constellation diagrams used by $CMS_{1c}$ and $CMS_{3c}$ meet $$d_1 \geq 2\frac{\sqrt{N_0 + |h_{21}|^2 (P_{1p} + P_{2c}) + |h_{22}|^2 P_{3p}}}{|h_{21}|} \text{ and}$$

$$d_2 \geq 2\frac{\sqrt{N_0 + |h_{21}|^2 (P_{1p} + P_{2c}) + |h_{22}|^2 P_{3p}}}{|h_{22}|}$$

respectively.

2: The constellation diagrams used by $CMS_{1c}$ and $CMS_{3c}$ fall within one grid at the terminal 2, that is, it is required that any constellation points $c_{1c}$ and $c_{3c}$ in the constellation diagrams used by $CMS_{1c}$ and $CMS_{3c}$ meet $h_{21}c_{1c}$, $h_{22}c_{3c} \in \{Am : m \in Z^{2\times 1}\}$, where $A \in C^{1\times 2}$, A is a preset two-dimensional complex number vector, and $Z^{2\times 1}$ represents an integer column vector with two rows and one column.

Exemplarily, a method for selecting a CMS to meet the foregoing conditions is provided.

First, it is considered to restrict that any constellation points $c_{1c}$ and $c_{3c}$ in the constellation diagrams meet the following condition $h_{21}c_{1c}, h_{22}c_{3c} \in \{Am : m \in Z^{2\times 1}\}$.

Actually, a quadrature amplitude modulation (Quadrature Amplitude Modulation, QAM) is a modulation scheme that meets the requirements. Because any constellation point in QAM can be expressed as $an+bki$, $n,k \in Z$, $a,b \in Z$, $A=[a,bi]$ and $m=[n,k]^T$. In this case, the modulation constellation diagrams used by $CMS_{1c}$ and $CMS_{3c}$ are respectively $$\left\{\frac{an+bki}{h_{21}} : n, k \in Z\right\} \text{ and } \left\{\frac{an+bki}{h_{22}} : n, k \in Z\right\},$$

where $CMS_{1c}$ is a CMS corresponding to the codeword of the first information corresponding to the terminal 1, and $CMS_{3c}$ is a CMS corresponding to the codeword of the first information corresponding to the terminal 2.

Second, it is considered to restrict that smallest Euclidean distances $d_1$ and $d_2$ between constellation points in a constellation diagram used by a CMS meet $$d_1 \geq 2\frac{\sqrt{N_0 + |h_{21}|^2 (P_{1p} + P_{2c}) + |h_{22}|^2 P_{3p}}}{|h_{21}|} \text{ and}$$

$$d_2 \geq 2\frac{\sqrt{N_0 + |h_{21}|^2 (P_{1p} + P_{2c}) + |h_{22}|^2 P_{3p}}}{|h_{22}|}$$

respectively.

A person skilled in the art easily understands that smallest distances between the constellation points used by $CMS_{1c}$ and $CMS_{3c}$ are $$\frac{\min(|a|, |b|)}{|h_{21}|} \text{ and } \frac{\min(|a|, |b|)}{|h_{22}|}$$

respectively.

Apparently, if $a=b=2\sqrt{N_0+|h_{21}|^2(P_{1p}+P_{2c})+|h_{22}|^2 P_{3p}}$ is selected, modulation schemes that meet the requirements are obtained, which are $$CMS_{1c} = \left\{\frac{\sqrt{N_0 + |h_{21}|^2 (P_{1p} + P_{2c}) + |h_{22}|^2 P_{3p}}}{h_{21}}(n+ki) : n, k \in Z\right\}$$

and $$CMS_{3c} = \left\{\frac{\sqrt{N_0 + |h_{21}|^2 (P_{1p} + P_{2c}) + |h_{22}|^2 P_{3p}}}{h_{21}}(n+ki) : n, k \in Z\right\}$$

respectively.

Step 3: The base station 1 superposes $x_{1c}$, $x_{1p}$, and $x_{2c}$, and then transmits a superposition to the terminal 1 and the terminal 2, that is, a signal transmitted by the base station 1 is $x = x_{1c} + x_{2c} + x_{1p}$.

It should be noted that the sum of the transmit powers of the three codewords shall be not greater than a maximum transmit power of the base station 1, that is, a restriction relationship $P_{1p} + P_{1c} + P_{2c} \leq P_1$ shall be met, where $P_1$ is the maximum transmit power of the base station 1.

It should be noted that in an actual system, because a cell center user is generally closer to a base station, a path loss of a received signal is relatively small, and a path loss of a signal that is from another base station is relatively large, leading to a higher SINR; on the contrary, at an edge of a cell, a signal power in the current cell is similar to a signal power in a neighboring cell, leading to a lower SINR. Therefore, in this embodiment of the present invention, how to inhibit interference at an edge user is mainly considered, while a center user considers that interference can be resisted with its higher SINR value.

This embodiment of the present invention provides the downlink MA method in which interference from a second base station in a neighboring cell is considered, avoiding a problem that when interference exists, if interference is not considered, a transmitted signal cannot be detected because an SINR at a receive end is reduced, and increasing a rate of correctly detecting a transmitted signal at the receive end. In addition, according to a third condition met by a transmit rate for a codeword of first information corresponding to a third terminal of N terminals, it can be known that in this embodiment of the present invention, interference from a neighboring cell is inhibited through interference alignment, which can increase a transmit rate of an interference-aligned user terminal.

Embodiment 2

This embodiment of the present invention provides a downlink MA method. Specifically, as shown in FIG. 5, the method includes the following steps.

501: If there is interference from a first base station in a neighboring cell, a second base station transmits a superposition of a codeword of first information and a codeword of second information to a fourth terminal and a second terminal, where the first information and the second information are corresponding to the fourth terminal, the fourth terminal is an interference-aligned user terminal, and the second terminal is an edge user terminal served by the first base station.

The codeword of the first information corresponding to the fourth terminal is obtained according to a transmit rate and a transmit power for the codeword of the first information corresponding to the fourth terminal, the codeword of the second information corresponding to the fourth terminal is obtained according to a transmit rate and a transmit power for the codeword of the second information corresponding to the fourth terminal, the transmit rate for the codeword of the first information corresponding to the fourth terminal meets a first condition, and a transmit rate for the second information corresponding to the fourth terminal meets a second condition, where the first condition is: when codewords of first information corresponding to (N−1) terminals, other than a third terminal, of N terminals served by the first base station, codewords of second information corresponding to the N terminals, and the codeword of the second information corresponding to the fourth terminal are regarded as noise, a superposition of a codeword of first information corresponding to the third terminal and the codeword of the first information corresponding to the fourth terminal can be decoded correctly at a second terminal of the N terminals, and when the codeword of the second information corresponding to the fourth terminal is regarded as noise, the first information corresponding to the fourth terminal can be decoded correctly at the fourth terminal; the second condition is that correct decoding can be performed at the fourth terminal; and the third terminal is an interference-aligned user terminal.

Specifically, in this embodiment of the present invention, a message corresponding to each terminal is partitioned into two parts: first information and second information. Either part of information may be detected in a different detection manner.

Preferably, the first information is information used by all terminals capable of receiving the first information, to perform joint detection, and the second information is information used by the terminal to perform single-user detection.

Exemplarily, it is assumed that a message transmitted by the second base station to the fourth terminal is in, and is partitioned into two parts: $m_{3p}$ and $m_{3c}$, where $m_{3c}$ is referred to as the first information, and this part of information needs to be decoded in a detection manner in SD and at all receive ends capable of receiving the information; and $m_{3p}$ is referred to as the second information, and this part of information may be decoded in a traditional single-user detection manner at a corresponding terminal, that is, the fourth terminal, and be equivalent to noise at a non-corresponding receive end.

Further, the first condition met by the transmit rate for the codeword of the first information corresponding to the fourth terminal may be specifically shown in formula (10) and formula (11):

$$R_{1A} \leq \log_2\left(1 + \frac{|h_{21}|^2 P_{tc} + |h_{k2}|^2 P'_c}{N_0 + |h_{k1}|^2 \sum_{j \neq t}^{N} P_{jc} + |h_{k1}|^2 \sum_{j=1}^{N} P_{jp} + |h_{k2}|^2 P'_p}\right), \quad \text{formula (10)}$$

and $$R'_c \leq \log_2\left(1 + \frac{|h'|^2 P'_c}{N_0 + |h'|^2 P'_p}\right); \quad \text{formula (11)}$$

and the second condition met by the transmit rate for the second information corresponding to the fourth terminal may be specifically shown in formula (12):

$$R'_p \leq \log_2\left(1 + \frac{|h'|^2 P'_p}{N_0}\right), \quad \text{formula (12)}$$

where $R_c'$ represents the transmit rate for the codeword of the first information corresponding to the fourth terminal; $R_p'$ represents the transmit rate for the codeword of the second information corresponding to the fourth terminal; $R_{IA}$ represents a transmit rate for the superposition of the codeword of the first information corresponding to the third terminal and the codeword of the first information corresponding to the fourth terminal; $N_0$ represents a local noise power of the fourth terminal; $h_{k1}$ represents a channel fading factor between the second terminal and the first base station; $h_{k2}$ represents a channel fading factor between the second terminal and the second base station; h' represents a channel fading factor between the fourth terminal and the second base station; $P_{jp}$ represents a transmit power for a codeword of second information corresponding to the $j^{th}$ terminal of the N terminals served by the first base station; $P_{jc}$ represents a transmit power for a codeword of first information corresponding to the $j^{th}$ terminal; $P_p'$ represents the transmit power for the codeword of the second information corresponding to the fourth terminal; and $P_c'$ represents the transmit power for the codeword of the first information corresponding to the fourth terminal, where a user k is the second terminal served by the first base station, and a user t is the third terminal served by the first base station.

It should be noted that the second base station may separately code, by using a reliable CMS, the first information and the second information that are corresponding to the fourth terminal, and further obtain the codeword of the first information corresponding to the fourth terminal and the codeword of the second information corresponding to the fourth terminal. For related descriptions of the "reliable CMS", refer to the descriptions in the preface of DESCRIPTION OF EMBODIMENTS, and no details are repeated herein in this embodiment of the present invention.

Preferably, that a superposition of a codeword of first information corresponding to the third terminal and the codeword of the first information corresponding to the fourth terminal can be decoded correctly at a second terminal of the N terminals may specifically include: smallest Euclidean distances $d_1$ and $d_2$ between constellation points in a constellation diagram used by a coding and modulating scheme CMS that is corresponding to the codeword of the first information corresponding to the third terminal and the codeword of the first information corresponding to the fourth terminal meet formula (8) and formula (9) respectively;

$$d_1 \geq 2\frac{\sqrt{N_0 + |h_{k1}|^2 \sum_{j \neq t} P_{jc} + |h_{k1}|^2 \sum_{j=1}^{N} P_{jp} + |h_{k2}|^2 P'_p}}{|h_{k1}|}, \quad \text{formula (8)}$$

and $$d_2 \geq 2\frac{\sqrt{N_0 + |h_{k1}|^2 \sum_{j \neq t} P_{jc} + |h_{k1}|^2 \sum_{j=1}^{N} P_{jp} + |h_{k2}|^2 P'_p}}{|h_{k2}|}; \quad \text{formula (9)}$$

and any constellation points $c_{kc}$ and $c_{tc}$ in the constellation diagram meet the following conditions: $h_{k1}c_{kc} \in \{Am: m \in Z^{2 \times 1}\}$ and $h_{k2}c_{tc} \in \{Am: m \in Z^{2 \times 1}\}$, where $A \in C^{1 \times 2}$, A is a preset two-dimensional complex number vector, and $Z^{2 \times 1}$ represents an integer column vector with two rows and one column.

In an example of the cellular system that includes two cells and that is shown in FIG. 4 in Embodiment 1, expositions of an entire process of the downlink MA method on a side of the second base station provided in this embodiment of the present invention are provided in the following. First information corresponding to a terminal 3 is recorded as $m_{3c}$, and second information corresponding to the terminal 3 is recorded as $m_{3p}$.

Step 1: A base station 2 determines, according to formula (10) and formula (11), that a transmit power for a codeword of the first information corresponding to the terminal 3 is $P_{3c}$ and that a transmit rate $R_{3c}$ meets $$R_{3c} \leq \log_2\left(1 + \frac{|h_{22}|^2 P_{3c}}{N_0 + |h_{21}|^2 (P_{1p} + P_{2c}) + |h_{22}|^2 P_{3p}}\right);$$

and the base station 2 determines, according to formula (12), that a transmit power for a codeword of the second information corresponding to the terminal 3 is $P_{3p}$, and that a transmit rate $R_{3p}$ meets $$R_{3p} \leq \log_2\left(1 + \frac{|h_{32}|^2 P_{3p}}{N_0}\right).$$

Step 2: The base station 2 codes $m_{3p}$ into a codeword $x_{3p}$ with the transmit rate $R_{3p}$ and the transmit power $P_{3p}$ by using a reliable CMS recorded as $CMS_{3p}$, where $R_{3p}$ meets $$R_{3p} \leq \log_2\left(1 + \frac{|h_{32}|^2 P_{3p}}{N_0}\right);$$

and the base station 2 codes $m_{3c}$ into a codeword $x_{3c}$ with the transmit rate $R_{3c}$ and the transmit power $P_{3c}$ by using a reliable CMS recorded as $CMS_{3c}$, where $R_{3c}$ meets $$R_{3p} \leq \log_2\left(1 + \frac{|h_{22}|^2 P_{3c}}{N_0 + |h_{21}|^2 (P_{1p} + P_{2c}) + |h_{22}|^2 P_{3p}}\right).$$

In addition, the following special requirements are raised on $CMS_{1c}$ and $CMS_{3c}$:

1: Smallest Euclidean distances $d_1$ and $d_2$ between constellation points in constellation diagrams used by $CMS_{1c}$ and $CMS_{3c}$ meet $$d_1 \geq 2\frac{\sqrt{N_0 + |h_{21}|^2 (P_{1p} + P_{2c}) + |h_{22}|^2 P_{3p}}}{|h_{21}|} \text{ and}$$

$$d_2 \geq 2\frac{\sqrt{N_0 + |h_{21}|^2 (P_{1p} + P_{2c}) + |h_{22}|^2 P_{3p}}}{|h_{21}|}$$

respectively.

2: The constellation diagrams used by $CMS_{1c}$ and $CMS_{3c}$ fall within one grid at the terminal 2, that is, it is required that any constellation points $c_{1c}$ and $c_{3c}$ in the constellation diagrams used by $CMS_{1c}$ and $CMS_{3c}$ meet $h_{21}c_{1c}$, $h_{22}c_{3c} \in \{Am: m \in Z^{2 \times 1}\}$, where $A \in C^{1 \times 2}$, A is a preset two-dimensional complex number vector, and $Z^{2 \times 1}$ represents an integer column vector with two rows and one column.

Specifically, for a method for selecting a CMS to meet the foregoing conditions, refer to the descriptions in Embodiment 1, and no details are repeated herein in this embodiment of the present invention.

Step 3: The base station 2 superposes $x_{3c}$ and $x_{3p}$, and then transmits a superposition to the terminal 2 and the terminal 3, that is, $x_2 = x_{3c} + x_{3p}$.

It should be noted that the sum of the transmit powers of the two codewords shall be not greater than a maximum transmit power of the base station 2, that is, a restriction relationship $P_{3p} + P_{3c} \leq P_2$ shall be met, where $P_2$ is the maximum transmit power of the base station 2.

This embodiment of the present invention provides the downlink MA method in which interference from a first base station in a neighboring cell is considered. In the method, a second base station transmits a superposition of a codeword of first information and a codeword of second information to a fourth terminal and a second terminal, where the first information and the second information are corresponding to the fourth terminal. This avoids a problem that when interference exists, if interference is not considered, a transmitted signal cannot be detected because an SINR at a receive end is reduced, and increases a rate of correctly detecting a transmitted signal at the receive end. In addition, according to a first condition met by a transmit rate for a codeword of first information corresponding to the fourth terminal, it can be known that in this embodiment of the present invention, interference from a neighboring cell is inhibited through interference alignment, which can increase a transmit rate of an interference-aligned user terminal.

Embodiment 3

Figure 6:
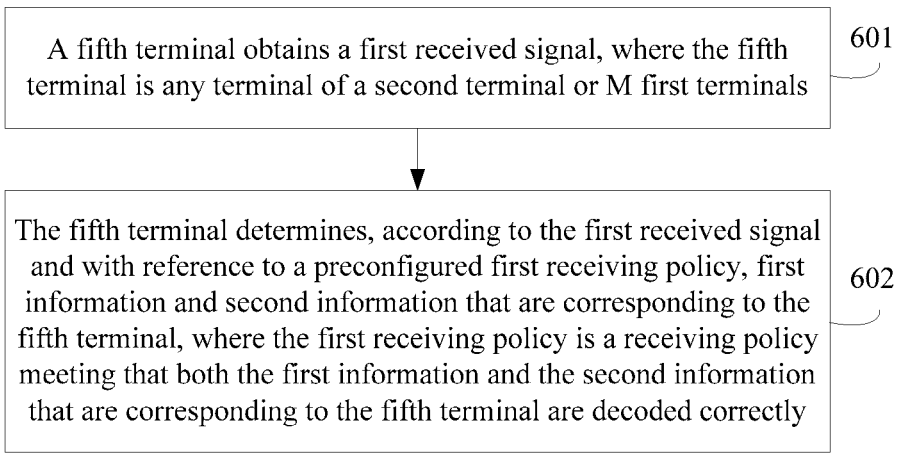
FIG. 6 is a schematic flowchart of another downlink MA method according to an embodiment of the present invention.

This embodiment of the present invention provides a downlink MA method, which is applied to a cellular communications system. Channels between M first terminals and a first base station that are in the cellular communications system belong to a first channel, a channel between a second terminal and the first base station belongs to a second channel, and a channel fading factor of the first channel is not less than a channel fading factor of the second channel, where $M \geq 1$, and M is an integer. Specifically, as shown in FIG. 6, the method includes:

601: A fifth terminal obtains a first received signal, where the fifth terminal is any terminal of the second terminal or the M first terminals.

It should be noted that the fifth terminal that executes the present invention may be any first terminal of the M first terminals, or may be the second terminal, and this embodiment of the present invention imposes no specific limitation thereon.

602: The fifth terminal determines, according to the first received signal and with reference to a preconfigured first receiving policy, first information and second information that are corresponding to the fifth terminal.

The first receiving policy is a receiving policy meeting that both the first information and the second information that are corresponding to the fifth terminal are decoded correctly.

Specifically, in this embodiment of the present invention, a message corresponding to each terminal is partitioned into two parts: first information and second information. Either part of information may be detected in a different detection manner.

Preferably, the first information is information used by all terminals capable of receiving the first information, to perform joint detection, and the second information is information used by the terminal to perform single-user detection.

Exemplarily, it is assumed that a message corresponding to the fifth terminal is $m_i$ and is partitioned into two parts: $m_{ip}$ and $m_{ic}$, where $m_{ic}$ is referred to as the first information, and this part of information needs to be decoded in a detection manner in SD and at all terminals capable of receiving the information; and $m_{ip}$ is referred to as second information, and this part of information may be decoded in a traditional single-user detection manner at a corresponding receive end, that is, a terminal i corresponding to the second information, and be equivalent to noise at a non-corresponding receiving terminal.

Further, the first receiving policy may specifically include: after the fifth terminal obtains the first received signal, detecting, by the fifth terminal according to the first received signal, first information corresponding to the M first terminals; obtaining a second signal according to the first received signal and the first information corresponding to the M first terminals; detecting, according to the second signal, first information corresponding to the second terminal; obtaining a third signal according to the second signal and the first information corresponding to the second terminal; and detecting, according to the third signal, the second information corresponding to the fifth terminal.

Particularly, assuming that the second terminal is the $k^{th}$ terminal, because a channel fading factor between the second terminal and the first base station is worst, it may be particularly defined that $m_{kc}=m_k$, that is, the entire $m_k$ is used as the first information, and the second information is 0. In this case, if the fifth terminal is specifically the second terminal, in the current receiving policy, after the first information corresponding to the second terminal is detected, there may be no need to continue to detect the second information corresponding to the second terminal. The first information corresponding to the second terminal is a message corresponding to the second terminal. This embodiment of the present invention imposes no specific limitation thereon.

Because the first information corresponding to the second terminal is finally detected in the detection sequence in SD in this solution corresponding to this case, the second terminal can obtain a higher SINR, thereby increasing a transmit rate between the first base station and the terminal.

In an example of the DBC (M=1 and N=2) shown in FIG. 2, expositions of an entire process of the downlink MA method on a side of the fifth terminal provided in this embodiment of the present invention are provided in the following with reference to the elaborated process of the downlink MA method on the side of the first base station in Embodiment 1. In the DBC shown in FIG. 2, in order not to lose generality, it is assumed that $|h_1| \geq |h_2|$. Particularly, if $m_{2c}=m_2$, the terminal 1 is a first terminal, and the terminal 2 is a second terminal. Expositions of an entire process of a downlink MA method on a side of the terminal 1 are provided as follows.

Step 1: The terminal 1 obtains a first received signal $y_1 = h_1 x_{1c} + h_1 x_{2c} + h_1 x_{1p} + n_1$.

Step 2: Regard both $x_{2c}$ and $x_{1p}$ as noise, detect, from $y_1$ by using a DDS that is corresponding to $CMS_{1c}$ and that is recorded as $DDS_{1c}$, first information $m_{1c}$ corresponding to the terminal 1, and record a detection result as $\hat{m}_{1c}$.

Step 3: The terminal 1 recodes $\hat{m}_{1c}$ by using $CMS_{1c}$, to obtain estimation $\hat{x}_{1c}$ for $x_{1c}$, reconstructs $h_1 \hat{x}_{1c}$ according to the channel fading factor $h_1$, and then subtracts $h_1 \hat{x}_{1c}$ from $y_1$ to obtain a second signal $y_1' = y_1 - h_1 \hat{x}_{1c}$.

Step 4: Regard $x_{1p}$ as noise, detect, from $y_1'$ by using a DDS that is corresponding to $CMS_{2c}$ and that is recorded as $DDS_{2c}$, first information $m_{2c}$ corresponding to the terminal 2, and record a detection result as $\hat{m}_{2c}$.

Step 5: The terminal 1 recodes $\hat{m}_{2c}$ by using $CMS_{2c}$, to obtain estimation $\hat{x}_{2c}$ for $x_{2c}$, reconstructs $h_1 \hat{x}_{2c}$ according to the channel fading $h_1$, and then subtracts $h_1 \hat{x}_{2c}$ from $y_1'$ to obtain a third signal $y''_1 = y_1' - h_1 \hat{x}_{2c}$.

Step 6: Detect, from $y''_1$ by using a DDS that is corresponding to $CMS_{1p}$ and that is recorded as $DDS_{1p}$, second information $m_{1p}$ corresponding to the terminal 1, and record a detection result as $\hat{m}_{1p}$.

In the foregoing process, the terminal 1 detects that the required first information is in $\hat{m}_{1c}$, and the required second information is $\hat{m}_{1p}$, that is, for a message corresponding to the terminal 1, $m_1 = \hat{m}_{1c} + \hat{m}_{1p}$. Although being useless for the terminal 1, $\hat{m}_{2c}$ needs to be detected first herein and then impact of $\hat{m}_{2c}$ is removed, so as to eliminate interference of $\hat{m}_{2c}$. Through analysis similar to that in the NOMA technology, it is easy to prove that in the foregoing process, the required information can be surely effectively detected. In this way, for a transmit rate between the terminal 1 and a base station, $R_1 = R_{1c} + R_{1p}$.

Similarly, expositions of an entire process of a downlink MA method on a side of the terminal 2 are provided as follows.

Step 1: The terminal 2 obtains a first received signal $y_2 = h_2 x_{1c} + h_2 x_{2c} + h_2 x_{1p} + n_2$.

Step 2: Regard both $x_{2c}$ and $x_{1p}$ as noise, detect, from $y_2$ by using $DDS_{1C}$, first information $m_{1c}$ corresponding to the terminal 1, and record a detection result as $\hat{m}_{1c}$.

Step 3: The terminal 2 recodes $\hat{m}_{1c}$ by using $CMS_{1c}$, to obtain estimation $\hat{x}_{1c}$ for $x_{1c}$, reconstructs $h_2 \hat{x}_{1c}$ according to a channel fading factor $h_2$, and then subtracts $h_2 \hat{x}^{1c}$ from $y_1$ to obtain a second signal $y_2' = y_2 - h_2 \hat{x}_{1c}$.

Step 4: Regard $x_{1P}$ as noise, detect, from $y_2'$ by using $DDS_{2c}$, first information $m_{2c}$ corresponding to the terminal 2, and record a detection result as $\hat{m}_{2c}$.

So far, the terminal 2 has determined, according to the first received signal and with reference to a preconfigured second receiving policy, that for a message corresponding to the terminal 2, $m_2 = \hat{m}_{2c}$.

Through analysis similar to that in the NOMA technology, effectiveness of the foregoing steps is also very easily proved, and no details are repeated herein in this embodiment of the present invention. It can be known that for a transmit rate between the terminal 2 and a base station, $R_2 = R_{2c}$.

It should be noted that, the message corresponding to the terminal 2 in this example includes only the first information, and the second information is 0, that is, the entire message corresponding to the terminal 2 is regarded as the first information. In this case, there may be no need to perform steps similar to step 5 and step 6 on the side of the terminal 1, and the first information corresponding to the terminal 2 is the message corresponding to the terminal 2.

Similarly, in an example of the cellular system (M=1 and N=2) shown in FIG. 4, with reference to the elaborated process of the downlink MA method on the side of the first base station in Embodiment 1, for the downlink MA method on the side of the terminal 1, refer to the downlink MA method on the side of the terminal 1 in the DBC shown in FIG. 2, and no details are repeated herein. A first received signal in the model is: $y_1=h_{11}x_{1c}+h_{11}x_{2c}+h_{11}x_{1p}+n_1$.

In another possible scenario, the cellular communications system further includes a second base station, interference exists between the first base station and the second base station, and a center user terminal served by the second base station is a fourth terminal. In this case, if the fifth terminal is the second terminal, the first receiving policy may specifically include: after the second terminal obtains the first received signal, detecting, by the second terminal according to the first received signal, a superposition of a codeword of first information corresponding to a third terminal served by the first base station and a codeword of first information corresponding to the fourth terminal, where the third terminal and the fourth terminal are interference-aligned user terminals; obtaining a second signal according to the first received signal and the superposition of the codeword of the first information corresponding to the third terminal served by the first base station and the codeword of the first information corresponding to the fourth terminal; and if M=1, detecting, according to the second signal, the first information corresponding to the second terminal; obtaining a third signal according to the second signal and the first information corresponding to the second terminal; and detecting, according to the third signal, the second information corresponding to the second terminal; or if M>1, detecting, according to the second signal, first information corresponding to (M−1) first terminals, other than the third terminal, of the M first terminals; obtaining a third signal according to the second signal and the first information corresponding to the (M−1) first terminals, other than the third terminal, of the M first terminals; detecting, according to the third signal, the first information corresponding to the second terminal; obtaining a fourth signal according to the third signal and the first information corresponding to the second terminal; and detecting, according to the fourth signal, the second information corresponding to the second terminal.

It should be noted that, if the message corresponding to the second terminal includes only the first information, and the second information is 0, that is, the entire message corresponding to the second terminal is regarded as the first information. In a current receiving policy, after the first information corresponding to the second terminal is detected, there may be no need to continue to detect the second information corresponding to the second terminal, and the first information corresponding to the second terminal is the message corresponding to the second terminal. This embodiment of the present invention imposes no specific limitation thereon.

In an example of the cellular system (M=1 and N=2) shown in FIG. 4, with reference to the elaborated process of the downlink MA method on the side of the first base station in Embodiment 1, expositions of an entire process of the downlink MA method on a side of the second terminal provided in this embodiment of the present invention are provided. In the cellular system shown in FIG. 4, in order not to lose generality, assuming that $|h_{11}|>|h_{21}|$, $|h_{22}|>|h_{32}|$, and the terminal 1 and the terminal 3 are interference alignment terminals, the terminal 2 is the second terminal, the terminal 1 is the first terminal, the terminal 1 is the third terminal, and the terminal 3 is the fourth terminal. Particularly, if $m_{2c}=m_2$, expositions of an entire process of a downlink MA method on a side of the terminal 2 in the model are provided as follows:

Step 1: The terminal 2 obtains a first received signal $$y_2=h_{21}x_{1c}+h_{22}x_{3c}+h_{21}x_{2c}+h_{21}x_{1p}+h_{22}x_{3p}+n_2.$$

Step 2: The terminal 2 regards $x_{2c}$, $x_{1p}$, and $x_{3p}$ as noise, directly detects, from $y_2$, a superposition $h_{21}x_{1c}+h_{22}x_{3c}$ of a codeword of first information corresponding to the terminal 1 and a codeword of first information corresponding to the terminal 3, and records a detection result as $h_{21}\hat{x}_{1c}+h_{22}\hat{x}_{3c}$.

Step 3: Subtract the detection result from $y_2$ to obtain a second signal $y_2'=y_2-(h_{21}\hat{x}_{1c}+h_{22}\hat{x}_{3c})$.

Step 4: The terminal 2 regards both $x_{1p}$ and $x_{3p}$ as noise, detects, from $y_2'$ by using $DDS_{2c}$, first information $m_{2c}$ corresponding to the terminal 2, and records a detection result as $\hat{m}_{2c}$.

So far, the terminal 2 has determined, according to the first received signal and with reference to a preconfigured second receiving policy, that for a message corresponding to the terminal 2, $m_2=\hat{m}_{2c}$. It can be known that for a transmit rate between the terminal 2 and the base station 1, $R_2=R_{2c}$.

It should be noted that, the message corresponding to the terminal 2 in this example includes only the first information, and the second information is 0, that is, the entire message corresponding to the terminal 2 is regarded as the first information. In this case, there may be no need to detect the second information corresponding to the terminal 2, and the first information corresponding to the terminal 2 is the message corresponding to the terminal 2.

The following provides verification of effectiveness of a receiving mechanism for the terminal 2.

It is required that constellation diagrams used by $CMS_{1c}$ and $CMS_{3c}$ meet that: smallest Euclidean distances $d_1$ and $d_2$ between constellation points in the constellation diagrams used by $CMS_{1c}$ and $CMS_{3c}$ meet formula (8) and formula (9) respectively; and any constellation points $c_{1c}$ and $c_{3c}$ in the constellation diagrams meet the following condition: $h_{21}c_{1c}$, $h_{22}c_{3c}\in\{Am:m\in Z^{2\times1}\}$, where $A\in C^{1\times2}$, A is a preset two-dimensional complex number vector, and $Z^{2\times1}$ represents an integer column vector with two rows and one column.

Therefore, apparently, for a current smallest Euclidean distance between constellation points, $\min(a,b)\geq 2\sqrt{N_0+|h_{21}|^2(P_{1p}+P_{2c})+|h_{22}|^2P_{3p}}$, that is, an Euclidean distance between any two possible values of $h_{21}x_{1c}+h_{22}x_{3c}$ is greater than twice a standard deviation of equivalent noise (a superposition of $x_{1p}$, $x_{3p}$, $x_{2c}$, and local noise). According to a related conclusion on an information theory, this ensures that $h_{21}x_{1c}+h_{22}x_{3c}$ can be decoded in an error-free way. After being decoded, $h_{21}x_{1c}+h_{22}x_{3c}$ is subtracted from $y_2$, which also achieves an effect of interference elimination. Therefore, the message corresponding to the terminal 2 can also be surely detected finally. That is, two types of interference are aligned on one constellation diagram, ensuring detectability of a superposition of the two types of interference.

According to this embodiment of the present invention, a message partitioning mechanism is introduced to partition a message, corresponding to each terminal that communicates with a base station, into two parts: first information and second information; and after obtaining a first received signal, a fifth terminal determines, with reference to a preconfigured first receiving policy, first information and second information that are corresponding to the fifth terminal, where the first receiving policy is a receiving policy meeting that both the first information and the second information that are corresponding to the fifth terminal are decoded correctly, and the fifth terminal is any terminal of M first terminals or a second terminal. With reference to analysis on a side of a first base station, it can be known that by controlling a transmit power for a codeword of first information and a transmit power for a codeword of second information, the first base station may flexibly adjust transmit rates of N terminals that communicate with the first base station, where the first information and the second information are corresponding to each terminal of the N terminals, thereby implementing a flexible compromise on a transmit rate and fairness between different terminals that communicate with a base station. Therefore, in a case of implementing a flexible compromise on a transmit rate and fairness between different terminals that communicate with a base station, the downlink MA method provided in this embodiment of the present invention can ensure that a receiving terminal correctly detects a signal transmitted by a first base station.

Embodiment 4

Figure 7:
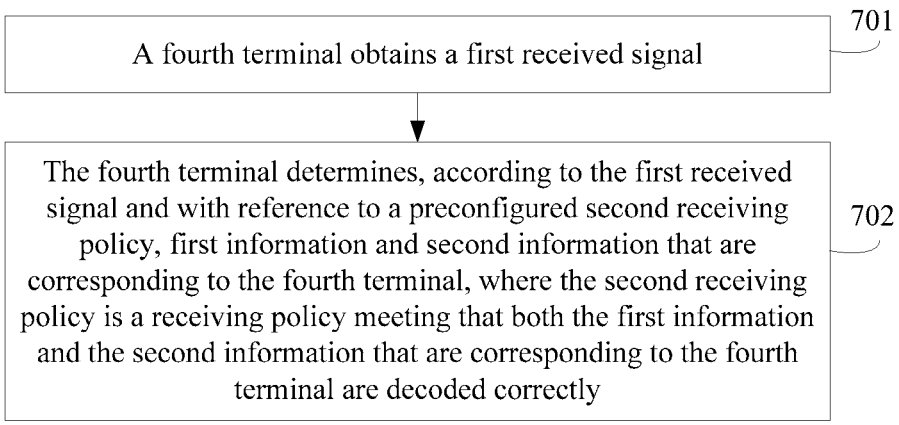
FIG. 7 is a schematic flowchart of still another downlink MA method according to an embodiment of the present invention.

This embodiment of the present invention provides a downlink MA method, which is applied to a cellular communications system, where the cellular communications system includes a first base station and a second base station, interference exists between the first base station and the second base station, and a center user terminal served by the second base station is a fourth terminal. Specifically, as shown in FIG. 7, the method includes the following steps.

701: The fourth terminal obtains a first received signal.

702: The fourth terminal determines, according to the first received signal and with reference to a preconfigured second receiving policy, first information and second information that are corresponding to the fourth terminal.

The second receiving policy is a receiving policy meeting that both the first information and the second information that are corresponding to the fourth terminal are decoded correctly.

Specifically, in this embodiment of the present invention, a message corresponding to each terminal is partitioned into two parts: first information and second information. Either part of information may be detected in a different detection manner.

Preferably, the first information is information used by all terminals capable of receiving the first information, to perform joint detection, and the second information is information used by the terminal to perform single-user detection.

Exemplarily, it is assumed that a message transmitted by the second base station to the fourth terminal is $m_3$ and is partitioned into two parts: $m_{3p}$ and $m_{3c}$, where $m_{3c}$ is referred to as the first information, and this part of information needs to be decoded in a detection manner in SD and at all receive ends capable of receiving the information; and $m_{3p}$ is referred to as the second information, and this part of information may be decoded in a traditional single-user detection manner at a corresponding terminal, that is, the fourth terminal, and be equivalent to noise at a non-corresponding receive end.

Further, the second receiving policy may specifically include: after the fourth terminal obtains the first received signal, detecting, by the fourth terminal according to the first received signal, the first information corresponding to the fourth terminal; obtaining a second signal according to the first received signal and the first information corresponding to the fourth terminal; and detecting, according to the second signal, the second information corresponding to the fourth terminal.

In an example of the cellular system shown in FIG. 4, with reference to the elaborated process of the downlink MA method on the side of the second base station in Embodiment 2, expositions of an entire process of the downlink MA method on a side of the fourth terminal provided in this embodiment of the present invention are provided in the following. In the cellular system shown in FIG. 4, a terminal 3 is the fourth terminal, and expositions of an entire process of a downlink MA method on a side of the terminal 3 are provided as follows.

Step 1: The terminal 3 obtains a first received signal $y_3 = h_{32}x_{3c} + h_{32}x_{3p} + n_3$.

Step 2: Regard $x_{3p}$ as noise, detect, from $y_3$ by using a DDS that is corresponding to $CMS_{3c}$ and that is recorded as $DDS_{3c}$, first information $m_{3c}$ corresponding to the terminal 3, and record a detection result as $\hat{m}_{3c}$.

Step 3: The terminal 3 recodes $\hat{m}_{3c}$ by using $CMS_{3c}$, to obtain estimation $\hat{x}_{3c}$ for $x_{3c}$, reconstructs $h_{32}\hat{x}_{3c}$ according to the channel fading factor $h_{32}$, and subtracts $h_{32}\hat{x}_{3c}$ from $y_3$ to obtain a second signal $y_3' = y_3 - h_{32}\hat{x}_{3c}$.

Step 4: Detect, from $y_3'$ by using a DDS that is corresponding to $CMS_{3p}$ and that is recorded as $DDS_{3p}$, second information $m_{3p}$ corresponding to the terminal 3, and record a detection result as $\hat{m}_{3p}$.

So far, the terminal 3 has determined, according to the first received signal and with reference to a preconfigured second receiving policy, that the first information corresponding to the terminal 3 is $\hat{m}_{3c}$, and that the second information is $\hat{m}_{3p}$, that is, for a message corresponding to the terminal 3, $m_3 = \hat{m}_{3c} + \hat{m}_{3p}$.

Through analysis similar to that in the NOMA technology, effectiveness of the foregoing steps is also very easily proved, and no details are repeated herein in this embodiment of the present invention. It can be known that for a transmit rate between the terminal 3 and the base station 1 and a transmit rate between the terminal 3 and the base station 2, $R_3 = R_{3c} + R_{3p}$.

According to this embodiment of the present invention, a message partitioning mechanism is introduced to partition a message, corresponding to a fourth terminal, into two parts: first information and second information; and after obtaining a first received signal, the fourth terminal determines, with reference to a preconfigured second receiving policy, the first information and the second information that are corresponding to the fourth terminal, where the second receiving policy is a receiving policy meeting that both the first information and the second information that are corresponding to the fourth terminal are decoded correctly. It can be known, with reference to analysis on a side of the second base station, that in a case of considering interference from a neighboring cell and increasing a transmit rate for a signal transmitted by a receiving terminal, the downlink MA method provided in this embodiment of the present invention can ensure that the receiving terminal correctly detects a signal transmitted by the second base station.

Embodiment 5

Figure 8:
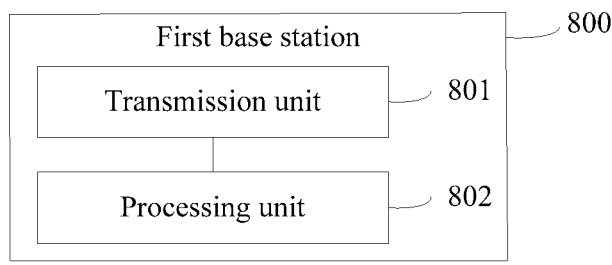
FIG. 8 is a schematic structural diagram of a first base station according to an embodiment of the present invention.

This embodiment of the present invention provides a first base station 800. Specifically, as shown in FIG. 8, the first base station 800 includes a transmission unit 801 and a processing unit 802.

The transmission unit 801 is configured to transmit a superposition of a codeword of first information and a codeword of second information to N terminals, where the first information and the second information are corresponding to each terminal of the N terminals, and N is a positive integer.

A codeword of first information corresponding to the $r^{th}$ terminal is obtained by the processing unit 802 according to a transmit rate and a transmit power for the codeword of the first information corresponding to the $r^{th}$ terminal, a codeword of second information corresponding to the $r^{th}$ terminal is obtained by the processing unit 802 according to a transmit rate and a transmit power for the codeword of the second information corresponding to the $r^{th}$ terminal, the transmit rate for the codeword of the first information corresponding to the $r^{th}$ terminal meets a first condition, and the transmit rate for the codeword of the second information corresponding to the $r^{th}$ terminal meets a second condition, where the first condition is: when codewords of second information corresponding to the N terminals are regarded as noise, the first information corresponding to the $r^{th}$ terminal can be decoded correctly at any terminal of the N terminals; the second condition is: when codewords of second information corresponding to the other (N−1) terminals are regarded as noise, the second information corresponding to the $r^{th}$ terminal can be decoded correctly at the $r^{th}$ terminal; and $1 \leq r \leq N$.

Preferably, the first information is information used by all terminals capable of receiving the first information, to perform joint detection, and the second information is information used by the terminal to perform single-user detection.

Particularly, if a detection sequence in successive decoding SD is the $1^{st}$ terminal, the $2^{nd}$ terminal, ..., and the $N^{th}$ terminal, the second condition met by the transmit rate for the codeword of the second information corresponding to the $r^{th}$ terminal includes:

$$R_{rp} \leq \log_2\left(1 + \frac{|h_r|^2 P_{rp}}{N_0 + |h_r|^2 \sum_{j=r} P_{rp}}\right), \forall\, r = 1, 2, \ldots, N;$$

and
the first condition met by the transmit rate for the codeword of the first information corresponding to the $r^{th}$ terminal includes:

$$R_{rc} \leq \log_2\left(1 + \frac{|h_m|^2 P_{rc}}{N_0 + |h_m|^2 \sum_r P_{rp} + |h_m|^2 \sum_{j=r+1}^{N} P_{jc}}\right),$$

$\forall\, m, r = 1, 2, \ldots N,$ where $R_{rp}$ represents the transmit rate for the codeword of the second information corresponding to the $r^{th}$ terminal; $R_{rc}$ represents the transmit rate for the codeword of the first information corresponding to the $r^{th}$ terminal; $N_0$ represents a local noise power of the $r^{th}$ terminal; $h_r$ represents a channel fading factor between the $r^{th}$ terminal and the first base station 800; $P_{rp}$ represents the transmit power for the codeword of the second information corresponding to the $r^{th}$ terminal; $P_{jp}$ represents a transmit power for a codeword of second information corresponding to the $j^{th}$ terminal; $h_m$ represents a channel fading factor between the $m^{th}$ terminal and the first base station 800; $P_{jc}$ represents a transmit power for a codeword of first information corresponding to the $j^{th}$ terminal; $P_{rc}$ represents the transmit power for the codeword of the first information corresponding to the $r^{th}$ terminal; and $\forall$ represents that the foregoing inequations are true for all values of variants.

In a possible scenario, if there is interference from a second base station in a neighboring cell, the first condition met by the transmit rate for the codeword of the first information corresponding to the $r^{th}$ terminal includes: a transmit rate for a codeword of first information corresponding to a third terminal of the N terminals meets a third condition, and a transmit rate for a codeword of first information corresponding to the $n^{th}$ terminal of (N−1) terminals, other than the third terminal, of the N terminals meets a fourth condition.

The third condition is: when codewords of first information corresponding to the (N−1) terminals, other than the third terminal, of the N terminals, the codewords of the second information corresponding to the N terminals, and a codeword of second information corresponding to a fourth terminal served by the second base station are regarded as noise, a superposition of the codeword of the first information corresponding to the third terminal and a codeword of first information corresponding to the fourth terminal can be decoded correctly at a second terminal of the N terminals, where the second terminal is an edge user terminal served by the first base station 800, and the third terminal and the fourth terminal are interference-aligned user terminals.

The fourth condition is: when the codewords of the second information corresponding to the N terminals and the codeword of the second information corresponding to the fourth terminal are regarded as noise, the first information corresponding to the $n^{th}$ terminal can be decoded correctly at the second terminal, and when the codewords of the second information corresponding to the N terminals are regarded as noise, the first information corresponding to the $n^{th}$ terminal can be decoded correctly at any terminal of (N−1) terminals, other than the second terminal, of the N terminals.

The second condition met by the transmit rate for the codeword of the second information corresponding to the $r^{th}$ terminal includes: a transmit rate for a codeword of second information corresponding to the second terminal of the N terminals meets a fifth condition, and a transmit rate for a codeword of second information corresponding to the $s^{th}$ terminal of the other (N−1) terminals than the second terminal of the N terminals meets a sixth condition.

The fifth condition is: when codewords of second information corresponding to the other (N−1) terminals than the second terminal of the N terminals and the codeword of the second information corresponding to the fourth terminal are regarded as noise, the second information corresponding to the second terminal can be decoded correctly at the second terminal.

The sixth condition is: when codewords of second information corresponding to the (N−1) terminals, other than the $s^{th}$ terminal, of the N terminals is regarded as noise, the second information corresponding to the $s^{th}$ terminal can be decoded correctly at the $s^{th}$ terminal.

Particularly, if the detection sequence in SD is the $1^{st}$ terminal, the $2^{nd}$ terminal, ..., and the $N^{th}$ terminal, the third condition met by the transmit rate for the codeword of the first information corresponding to the third terminal of the N terminals includes:

$$R_{1A} \leq \log_2\left(1 + \frac{|h_{k1}|^2 P_{tc} + |h_{k2}|^2 P'_c}{N_0 + |h_{k1}|^2 \sum_{j \neq t}^{N} P_{jc} + |h_{k1}|^2 \sum_{j=1}^{N} P_{jp} + |h_{k2}|^2 P'_p}\right);$$

the fourth condition met by the transmit rate for the codeword of the first information corresponding to the $n^{th}$ terminal of the (N−1) terminals, other than the third terminal, of the N terminals includes:

$$R_{nc} \leq \log_2\left(1 + \frac{|h_{k1}|^2 P_{nc}}{N_0 + |h_{k1}|^2 \sum_{\substack{j=n+1 \\ j \neq t}}^{N} P_{jc} + |h_{k1}|^2 \sum_{j=1}^{N} P_{jp} + |h_{k2}|^2 P'_p}\right),$$

$\forall n = 1, \ldots, t-1, t+1, \ldots, N$, and $$R_{nc} \leq \log_2\left(1 + \frac{|h_{s1}|^2 P_{nc}}{N_0 + |h_{s1}|^2 \sum_{j=n+1}^{N} P_{jc} + |h_{s1}|^2 \sum_{j=1}^{N} P_{jp}}\right),$$

$\forall n = 1, \ldots, t-1, t+1, \ldots, N$ $\forall s = 1, \ldots, k-1, k+1, \ldots, N;$ the fifth condition met by the transmit rate for the codeword of the second information corresponding to the second terminal of the N terminals includes:

$$R_{kp} \leq \log_2\left(1 + \frac{|h_{k1}|^2 P_{kp}}{N_0 + |h_{k1}|^2 \sum_{j=k}^{N} P_{jp} + |h_{k2}|^2 P'_p}\right);$$

and the sixth condition met by the transmit rate for the codeword of the second information corresponding to the $s^{th}$ terminal of the other (N−1) terminals than the second terminal of the N terminals includes:

$$R_{sp} \leq \log_2\left(1 + \frac{|h_{s1}|^2 P_{sp}}{N_0 + |h_{s1}|^2 \sum_{j \neq s} P_{sp}}\right),$$

$\forall s = 1, \ldots, k-1, k+1, \ldots, N,$ where $R_{1A}$ represents a transmit rate for the superposition of the codeword of the first information corresponding to the third terminal and the codeword of the first information corresponding to the fourth terminal; $h_{k1}$ represents a channel fading factor between the second terminal and the first base station 800; $P_{tc}$ represents the transmit rate for the codeword of the first information corresponding to the third terminal; $h_{k2}$ represents a channel fading factor between the fourth terminal and the second base station; P' represents a transmit power for the codeword of the second information corresponding to the fourth terminal; $N_0$ represents a local noise power; $P_{jp}$ represents the transmit power for the codeword of the second information corresponding to the $j^{th}$ terminal of the N terminals served by the first base station 800; $P_{jc}$ represents the transmit power for the codeword of the first information corresponding to the $j^{th}$ terminal; $R_{nc}$ represents the transmit rate for the codeword of the first information corresponding to the $n^{th}$ terminal of the (N−1) terminals, other than the third terminal, of the N terminals; $P_{nc}$ represents a transmit power for the codeword of the first information corresponding to the $n^{th}$ terminal; $h_{s1}$ represents a channel fading factor between the $s^{th}$ terminal of the other (N−1) terminals than the second terminal of the N terminals and the first base station 800; $R_{kp}$ represents the transmit rate for the codeword of the second information corresponding to the second terminal; $P_{kp}$ represents a transmit power for the codeword of the second information corresponding to the second terminal; $P_{sp}$ represents the transmit rate for the codeword of the second information corresponding to the $s^{th}$ terminal; and $\forall$ represents that the foregoing inequations are true for all values of variants, where a user k is the second terminal served by the first base station 800, and a user t is the third terminal served by the first base station 800.

Specifically, that a superposition of the codeword of the first information corresponding to the third terminal and a codeword of first information corresponding to the fourth terminal can be decoded correctly at a second terminal of the N terminals includes: smallest Euclidean distances $d_1$ and $d_2$ between constellation points in a constellation diagram used by a coding and modulating scheme CMS that is corresponding to the codeword of the first information corresponding to the third terminal and the codeword of the first information corresponding to the fourth terminal meet the following conditions respectively:

$$d_1 \geq 2 \frac{\sqrt{N_0 + |h_{k1}|^2 \sum_{j \neq t} P_{jc} + |h_{k1}|^2 \sum_{j=1}^{N} P_{jp} + |h_{k2}|^2 P'_p}}{|h_{k1}|}, \text{ and}$$

$$d_2 \geq 2 \frac{\sqrt{N_0 + |h_{k1}|^2 \sum_{j \neq t} P_{jc} + |h_{k1}|^2 \sum_{j=1}^{N} P_{jp} + |h_{k2}|^2 P'_p}}{|h_{k2}|};$$

and any constellation points $c_{kc}$ and $c_{tc}$ in the constellation diagram meet the following conditions: $h_{k1}c_{kc} \in \{Am: m \in Z^{2 \times 1}\}$ and $h_{k2}c_{tc} \in \{Am: m \in Z^{2 \times 1}\}$, where $A \in C^{1 \times 2}$, A is a preset two-dimensional complex number vector, and $Z^{2 \times 1}$ represents an integer column vector with two rows and one column.

Figure 12:
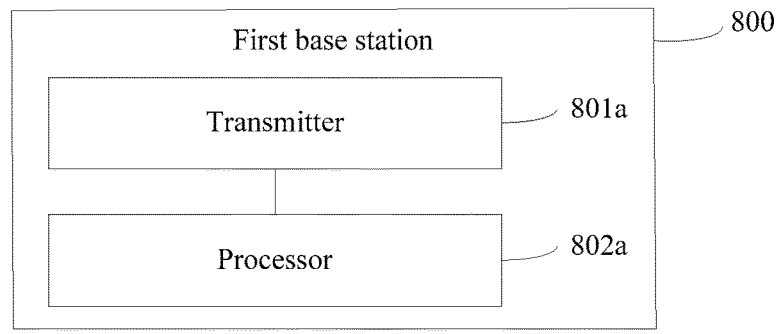
FIG. 12 is a schematic structural diagram of a first base station according to an embodiment of the present invention.

It should be noted that, as shown in FIG. 12, in the units and modules of the first base station 800 provided in this embodiment of the present invention, the transmission unit 801 may be specifically implemented by a transmitter 801a, the processing unit 802 may be specifically implemented by a processor 802a, and this embodiment of the present invention imposes no specific limitation thereon.

Specifically, for a downlink MA method executed by the first base station 800, refer to the descriptions in Embodiment 1, and no details are repeated herein in this embodiment of the present invention.

Because the first base station provided in this embodiment can be configured to execute the foregoing methods, for technical effects that can be obtained by the first base station, refer to the descriptions in the foregoing method embodiments, and no details are repeated herein.

Embodiment 6

Figure 9:
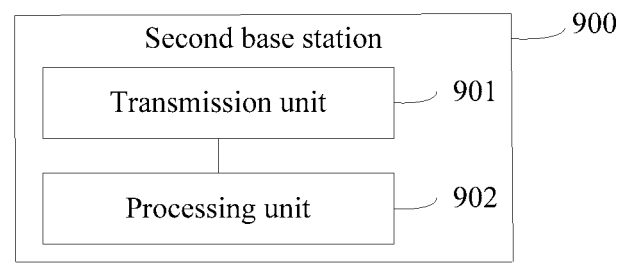
FIG. 9 is a schematic structural diagram of a second base station according to an embodiment of the present invention.

This embodiment of the present invention provides a second base station 900. Specifically, as shown in FIG. 9, the second base station 900 includes a transmission unit 901 and a processing unit 902.

The transmission unit 901 is configured to: if there is interference from a first base station in a neighboring cell, transmit a superposition of a codeword of first information and a codeword of second information to a fourth terminal and a second terminal, where the first information and the second information are corresponding to the fourth terminal, the fourth terminal is an interference-aligned user terminal, and the second terminal is an edge user terminal served by the first base station.

The codeword of the first information corresponding to the fourth terminal is obtained by the processing unit 902 according to a transmit rate and a transmit power for the codeword of the first information corresponding to the fourth terminal, the codeword of the second information corresponding to the fourth terminal is obtained by the processing unit 902 according to a transmit rate and a transmit power for the codeword of the second information corresponding to the fourth terminal, the transmit rate for the codeword of the first information corresponding to the fourth terminal meets a first condition, and a transmit rate for the second information corresponding to the fourth terminal meets a second condition, where the first condition is: when codewords of first information corresponding to (N−1) terminals, other than a third terminal, of N terminals served by the first base station, codewords of second information corresponding to the N terminals, and the codeword of the second information corresponding to the fourth terminal are regarded as noise, a superposition of a codeword of first information corresponding to the third terminal and the codeword of the first information corresponding to the fourth terminal can be decoded correctly at a second terminal of the N terminals, and when the codeword of the second information corresponding to the fourth terminal is regarded as noise, the first information corresponding to the fourth terminal can be decoded correctly at the fourth terminal; the second condition is that correct decoding can be performed at the fourth terminal; and the third terminal is an interference-aligned user terminal.

Preferably, the first information is information used by all terminals capable of receiving the first information, to perform joint detection, and the second information is information used by the terminal to perform single-user detection.

Particularly, the first condition met by the transmit rate for the codeword of the first information corresponding to the fourth terminal includes:

$$R_{IA} \leq \log_2\left(1 + \frac{|h_{k1}|^2 P_{tc} + |h_{k2}|^2 P'_c}{N_0 + |h_{k1}|^2 \sum_{j \neq t}^{N} P_{jc} + |h_{k1}|^2 \sum_{j=1}^{N} P_{jp} + |h_{k2}|^2 P'_p}\right), \text{ and}$$

$$R'_c \leq \log_2\left(1 + \frac{|h'|^2 P'_c}{N_0 + |h'|^2 P'_p}\right).$$

The second condition met by the transmit rate for the second information corresponding to the fourth terminal includes:

$$R'_p \leq \log_2\left(1 + \frac{|h'|^2 P'_p}{N_0}\right),$$

where $R_c'$ represents the transmit rate for the codeword of the first information corresponding to the fourth terminal; $R_p'$ represents the transmit rate for the codeword of the second information corresponding to the fourth terminal; $R_{IA}$ represents a transmit rate for the superposition of the codeword of the first information corresponding to the third terminal and the codeword of the first information corresponding to the fourth terminal; $N_0$ represents a local noise power of the fourth terminal; $h_{k1}$ represents a channel fading factor between the second terminal and the first base station; $h_{k2}$ represents a channel fading factor between the second terminal and the second base station 900; h' represents a channel fading factor between the fourth terminal and the second base station 900; $P_{jp}$ represents a transmit power for a codeword of second information corresponding to the $j^{th}$ terminal of the N terminals served by the first base station; $P_{jc}$ represents a transmit power for a codeword of first information corresponding to the $j^{th}$ terminal; $P_p'$ represents the transmit power for the codeword of the second information corresponding to the fourth terminal; and $P_c'$ represents the transmit power for the codeword of the first information corresponding to the fourth terminal, where a user k is the second terminal served by the first base station, and a user t is the third terminal served by the first base station.

Specifically, that a superposition of a codeword of first information corresponding to the third terminal and the codeword of the first information corresponding to the fourth terminal can be decoded correctly at a second terminal of the N terminals includes: smallest Euclidean distances $d_1$ and $d_2$ between constellation points in a constellation diagram used by a coding and modulating scheme CMS that is corresponding to the codeword of the first information corresponding to the third terminal and the codeword of the first information corresponding to the fourth terminal meet the following conditions respectively:

$$d_1 \geq 2\frac{\sqrt{N_0 + |h_{k1}|^2 \sum_{j \neq t} P_{jc} + |h_{k1}|^2 \sum_{j=1}^{N} P_{jp} + |h_{k2}|^2 P'_p}}{|h_{k1}|}, \text{ and}$$

$$d_2 \geq 2\frac{\sqrt{N_0 + |h_{k1}|^2 \sum_{j \neq t} P_{jc} + |h_{k1}|^2 \sum_{j=1}^{N} P_{jp} + |h_{k2}|^2 P'_p}}{|h_{k2}|};$$

and any constellation points $c_{kc}$ and $c_{tc}$ in the constellation diagram meet the following conditions: $h_{k1}c_{kc} \in \{Am: m \in Z^{2 \times 1}\}$ and $h_{k2}c_{tc} \in \{Am: m \in Z^{2 \times 1}\}$, where a channel fading factor for a terminal is corresponding to the constellation point, $A \in C^{1 \times 2}$, A is a preset two-dimensional complex number vector, and $Z^{2 \times 1}$ represents an integer column vector with two rows and one column.

Figure 13:
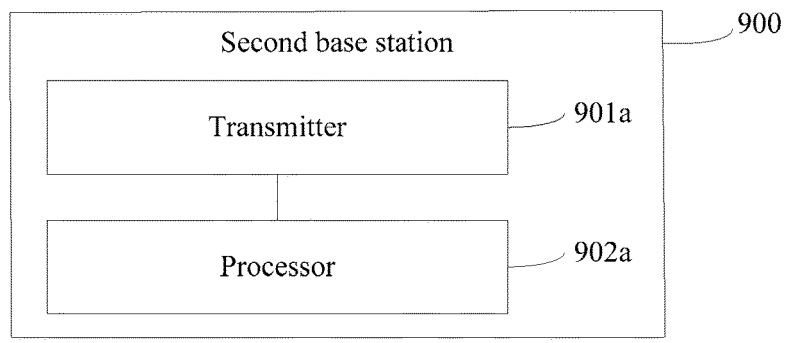
FIG. 13 is a schematic structural diagram of a second base station according to an embodiment of the present invention.

It should be noted that, as shown in FIG. 13, in the units and modules of the second base station 900 provided in this embodiment of the present invention, the transmission unit 901 may be specifically implemented by a transmitter 901a, the processing unit 902 may be specifically implemented by a processor 902a, and this embodiment of the present invention imposes no specific limitation thereon.

Specifically, for a downlink MA method executed by the second base station 900, refer to the descriptions in Embodiment 2, and no details are repeated herein in this embodiment of the present invention.

Because the second base station provided in this embodiment can be configured to execute the foregoing methods, for technical effects that can be obtained by the second base station, refer to the descriptions in the foregoing method embodiments, and no details are repeated herein.

Embodiment 7

Figure 10:
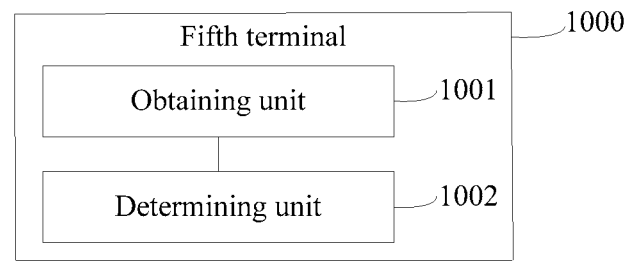
FIG. 10 is a schematic structural diagram of a fifth terminal according to an embodiment of the present invention.

This embodiment of the present invention provides a fifth terminal 1000, which is applied to a cellular communications system. Channels between M first terminals and a first base station that are in the cellular communications system belong to a first channel, a channel between a second terminal and the first base station belongs to a second channel, and a channel fading factor of the first channel is greater than a channel fading factor of the second channel, where $M \geq 1$, and M is an integer. The fifth terminal 1000 is any terminal of the M first terminals or the second terminal. As shown in FIG. 10, the fifth terminal 1000 includes an obtaining unit 1001 and a determining unit 1002.

The obtaining unit 1001 is configured to obtain a first received signal.

The determining unit 1002 is configured to determine, according to the first received signal and with reference to a preconfigured first receiving policy, first information and second information that are corresponding to the fifth terminal 1000.

The first receiving policy is a receiving policy meeting that both the first information and the second information that are corresponding to the fifth terminal 1000 are decoded correctly.

Preferably, the first information is information used by all terminals capable of receiving the first information, to perform joint detection, and the second information is information used by the terminal to perform single-user detection.

Specifically, the first receiving policy includes: after the fifth terminal 1000 obtains the first received signal, detecting, by the fifth terminal 1000 according to the first received signal, first information corresponding to the M first terminals; obtaining a second signal according to the first received signal and the first information corresponding to the M first terminals; detecting, according to the second signal, first information corresponding to the second terminal; obtaining a third signal according to the second signal and the first information corresponding to the second terminal; and detecting, according to the third signal, the second information corresponding to the fifth terminal 1000.

In a possible scenario, the cellular communications system further includes a second base station, interference exists between the first base station and the second base station, and a center user terminal served by the second base station is a fourth terminal.

If the fifth terminal 1000 is the second terminal, the first receiving policy includes: after the second terminal obtains the first received signal, detecting, by the second terminal according to the first received signal, a superposition of a codeword of first information corresponding to a third terminal served by the first base station and a codeword of first information corresponding to the fourth terminal, where the third terminal and the fourth terminal are interference-aligned user terminals; obtaining a second signal according to the first received signal and the superposition of the codeword of the first information corresponding to the third terminal served by the first base station and the codeword of the first information corresponding to the fourth terminal; and if M=1, detecting, according to the second signal, the first information corresponding to the second terminal; obtaining a third signal according to the second signal and the first information corresponding to the second terminal; and detecting, according to the third signal, the second information corresponding to the second terminal; or if M>1, detecting, according to the second signal, first information corresponding to (M−1) first terminals, other than the third terminal, of the M first terminals; obtaining a third signal according to the second signal and the first information corresponding to the (M−1) first terminals, other than the third terminal, of the M first terminals; detecting, according to the third signal, the first information corresponding to the second terminal; obtaining a fourth signal according to the third signal and the first information corresponding to the second terminal; and detecting, according to the fourth signal, the second information corresponding to the second terminal.

Specifically, for a downlink MA method executed by the fifth terminal 1000, refer to the descriptions in Embodiment 3, and no details are repeated herein in this embodiment of the present invention.

Because the fifth terminal provided in this embodiment can be configured to execute the foregoing methods, for technical effects that can be obtained by the fifth terminal, refer to the descriptions in the foregoing method embodiments, and no details are repeated herein.

Embodiment 8

Figure 11:
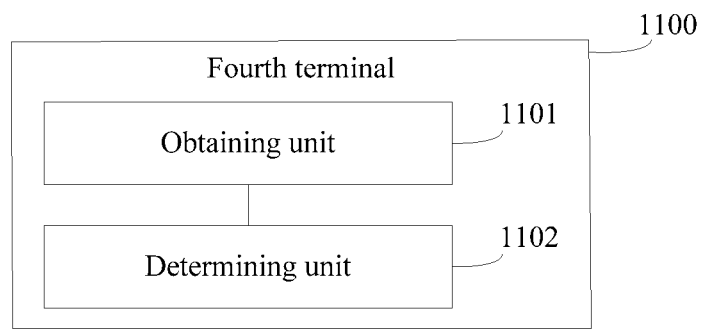
FIG. 11 is a schematic structural diagram of a fourth terminal according to an embodiment of the present invention.

This embodiment of the present invention provides a fourth terminal 1100, which is applied to a cellular communications system. The cellular communications system includes a first base station and a second base station, interference exists between the first base station and the second base station, and a center user terminal served by the second base station is the fourth terminal 1100. Specifically, as shown in FIG. 11, the fourth terminal 1100 includes an obtaining unit 1101 and a determining unit 1102.

The obtaining unit 1101 is configured to obtain a first received signal.

The fourth terminal 1100 determines, according to the first received signal and with reference to a preconfigured second receiving policy, first information and second information that are corresponding to the fourth terminal 1100.

The second receiving policy is a receiving policy meeting that both the first information and the second information that are corresponding to the fourth terminal 1100 are decoded correctly.

Preferably, the first information is information used by all terminals capable of receiving the first information, to perform joint detection, and the second information is information used by the terminal to perform single-user detection.

Specifically, the second receiving policy includes: after the fourth terminal 1100 obtains the first received signal, detecting, by the fourth terminal 1100 according to the first received signal, the first information corresponding to the fourth terminal 1100; obtaining a second signal according to the first received signal and the first information corresponding to the fourth terminal 1100; and detecting, according to the second signal, the second information corresponding to the fourth terminal 1100.

Specifically, for a downlink MA method executed by the fourth terminal 1100, refer to the descriptions in Embodiment 4, and no details are repeated herein in this embodiment of the present invention.

Because the fourth terminal provided in this embodiment can be configured to execute the foregoing methods, for technical effects that can be obtained by the fourth terminal, refer to the descriptions in the foregoing method embodiments, and no details are repeated herein.

Embodiment 9

Figure 14:
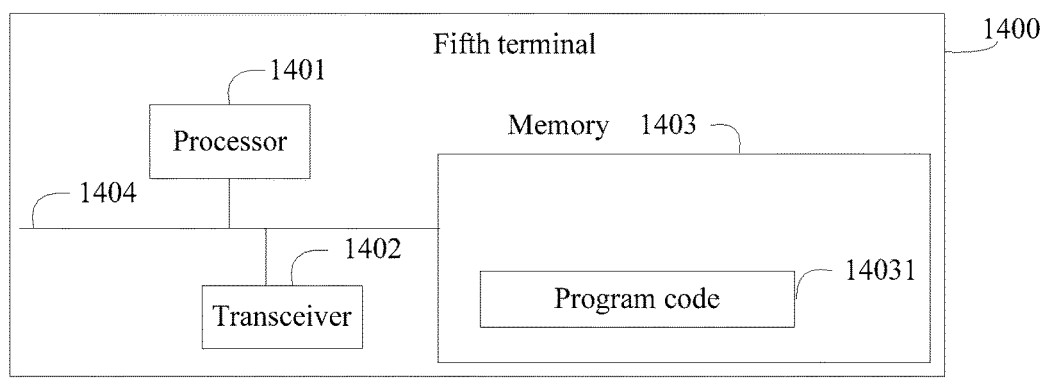
FIG. 14 is a schematic structural diagram of a fifth terminal according to an embodiment of the present invention.

This embodiment of the present invention provides a fifth terminal 1400, which is applied to a cellular communications system. Channels between M first terminals and a first base station that are in the cellular communications system belong to a first channel, a channel between a second terminal and the first base station belongs to a second channel, and a channel fading factor of the first channel is greater than a channel fading factor of the second channel, where M≥1, and M is an integer. The fifth terminal 1400 is any terminal of the M first terminals or the second terminal. As shown in FIG. 14, the fifth terminal 1400 includes a processor 1401, a transceiver 1402, a memory 1403, and a communications bus 1404.

The communications bus 1404 is configured to implement a connection and communication between the processor 1401, the transceiver 1402, and the memory 1403.

The transceiver 1402 is configured to perform communication between the fifth terminal 1400 and the outside.

The processor 1401 is configured to invoke program code 14031 stored in the memory 1403 to execute the following steps: obtaining a first received signal; and determining, according to the first received signal and with reference to a preconfigured first receiving policy, first information and second information that are corresponding to the fifth terminal 1400.

The first receiving policy is a receiving policy meeting that both the first information and the second information that are corresponding to the fifth terminal 1400 are decoded correctly.

Preferably, the first information is information used by all terminals capable of receiving the first information, to perform joint detection, and the second information is information used by the terminal to perform single-user detection.

Specifically, the first receiving policy includes: after the fifth terminal 1400 obtains the first received signal, detecting, by the fifth terminal 1400 according to the first received signal, first information corresponding to the M first terminals; obtaining a second signal according to the first received signal and the first information corresponding to the M first terminals; detecting, according to the second signal, first information corresponding to the second terminal; obtaining a third signal according to the second signal and the first information corresponding to the second terminal; and detecting, according to the third signal, the second information corresponding to the fifth terminal 1400.

In a possible scenario, the cellular communications system further includes a second base station, interference exists between the first base station and the second base station, and a center user terminal served by the second base station is a fourth terminal.

If the fifth terminal 1400 is the second terminal, the first receiving policy includes: after the second terminal obtains the first received signal, detecting, by the second terminal according to the first received signal, a superposition of a codeword of first information corresponding to a third terminal served by the first base station and a codeword of first information corresponding to the fourth terminal, where the third terminal and the fourth terminal are interference-aligned user terminals; obtaining a second signal according to the first received signal and the superposition of the codeword of the first information corresponding to the third terminal served by the first base station and the codeword of the first information corresponding to the fourth terminal; and if M=1, detecting, according to the second signal, the first information corresponding to the second terminal; obtaining a third signal according to the second signal and the first information corresponding to the second terminal; and detecting, according to the third signal, the second information corresponding to the second terminal; or if M>1, detecting, according to the second signal, first information corresponding to (M−1) first terminals, other than the third terminal, of the M first terminals; obtaining a third signal according to the second signal and the first information corresponding to the (M−1) first terminals, other than the third terminal, of the M first terminals; detecting, according to the third signal, the first information corresponding to the second terminal; obtaining a fourth signal according to the third signal and the first information corresponding to the second terminal; and detecting, according to the fourth signal, the second information corresponding to the second terminal.

Specifically, for a downlink MA method executed by the fifth terminal 1400, refer to the descriptions in Embodiment 3, and no details are repeated herein in this embodiment of the present invention.

Because the fifth terminal provided in this embodiment can be configured to execute the foregoing methods, for technical effects that can be obtained by the fifth terminal, refer to the descriptions in the foregoing method embodiments, and no details are repeated herein.

Embodiment 10

Figure 15:
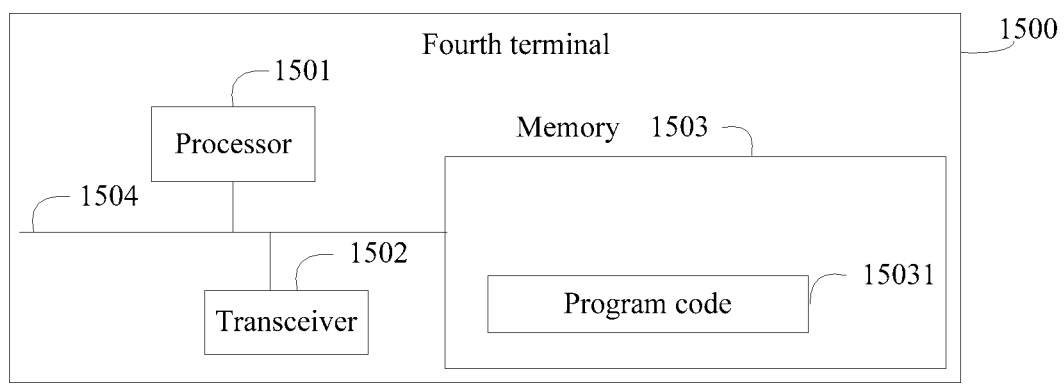
FIG. 15 is a schematic structural diagram of a fourth terminal according to an embodiment of the present invention.

This embodiment of the present invention provides a fourth terminal 1500, which is applied to a cellular communications system. The cellular communications system includes a first base station and a second base station, interference exists between the first base station and the second base station, and a center user terminal served by the second base station is the fourth terminal 1500. As shown in FIG. 15, the fourth terminal 1500 includes: a processor 1501, a transceiver 1502, a memory 1503, and a communications bus 1504.

The communications bus 1504 is configured to implement a connection and communication between the processor 1501, the transceiver 1502, and the memory 1503.

The transceiver 1502 is configured to perform communication between the fourth terminal 1500 and the outside.

The processor 1501 is configured to invoke program code 15031 stored in the memory 1503 to execute the following steps: obtaining a first received signal; and determining, according to the first received signal and with reference to a preconfigured second receiving policy, first information and second information that are corresponding to the fourth terminal 1500.

The second receiving policy is a receiving policy meeting that both the first information and the second information that are corresponding to the fourth terminal 1500 are decoded correctly.

Preferably, the first information is information used by all terminals capable of receiving the first information, to perform joint detection, and the second information is information used by the terminal to perform single-user detection.

Specifically, the second receiving policy includes: after the fourth terminal 1500 obtains the first received signal, detecting, by the fourth terminal 1500 according to the first received signal, the first information corresponding to the fourth terminal 1500; obtaining a second signal according to the first received signal and the first information corresponding to the fourth terminal 1500; and detecting, according to the second signal, the second information corresponding to the fourth terminal 1500.

Specifically, for a downlink MA method executed by the fourth terminal 1500, refer to the descriptions in Embodiment 4, and no details are repeated herein in this embodiment of the present invention.

Because the fourth terminal provided in this embodiment can be configured to execute the foregoing methods, for technical effects that can be obtained by the fourth terminal, refer to the descriptions in the foregoing method embodiments, and no details are repeated herein.

It may be clearly understood by a person skilled in the art that, for the purpose of convenient and brief description, for the apparatus described above, division of the foregoing function modules is merely used as an example for illustration. In actual application, the foregoing functions can be allocated to different modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor (processor) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A downlink multiple access (MA) method, comprising:
transmitting, by a first base station, a superposition of a codeword of first information and a codeword of second information to N terminals, wherein the first information and the second information correspond to each terminal of the N terminals, and N is a positive integer; and wherein a codeword of first information corresponding to an $r^{th}$ terminal is obtained according to a transmit rate and a transmit power for the codeword of the first information corresponding to the $r^{th}$ terminal, and a codeword of second information corresponding to the $r^{th}$ terminal is obtained according to a transmit rate and a transmit power for the codeword of the second information corresponding to the $r^{th}$ terminal, wherein the transmit rate for the codeword of the first information corresponding to the $r^{th}$ terminal meets a first condition, and the transmit rate for the codeword of the second information corresponding to the $r^{th}$ terminal meets a second condition, wherein the first condition comprises: when codewords of second information corresponding to the N terminals are regarded as noise, the first information corresponding to the $r^{th}$ terminal can be decoded correctly at any terminal of the N terminals, wherein the second condition comprises: when codewords of second information corresponding to the other (N−1) terminals are regarded as noise, the second information corresponding to the $r^{th}$ terminal can be decoded correctly at the $r^{th}$ terminal, and wherein $1 \leq r \leq N$;

wherein the first information is used by all terminals capable of receiving the first information to perform joint detection, and the second information is used by a terminal of the N terminals to perform single-user detection.

2. The method according to claim 1, wherein there is interference from a second base station in a neighboring cell, and the first condition met by the transmit rate for the codeword of the first information corresponding to the $r^{th}$ terminal comprises:
a transmit rate for a codeword of first information corresponding to a third terminal of the N terminals meets a third condition, and a transmit rate for a codeword of first information corresponding to the $n^{th}$ terminal of (N−1) terminals, other than the third terminal, of the N terminals meets a fourth condition;

wherein the third condition comprises: when codewords of first information corresponding to the (N−1) terminals, other than the third terminal, of the N terminals, the codewords of the second information corresponding to the N terminals, and a codeword of second information corresponding to a fourth terminal served by the second base station are regarded as noise, a superposition of the codeword of the first information corresponding to a third terminal and a codeword of first information corresponding to the fourth terminal can be decoded correctly at a second terminal of the N terminals, wherein the second terminal is an edge user terminal served by the first base station, and the third terminal and the fourth terminal are interference-aligned user terminals;

wherein the fourth condition comprises: when the codewords of the second information corresponding to the N terminals and the codeword of the second information corresponding to the fourth terminal are regarded as noise, the first information corresponding to the $n^{th}$ terminal can be decoded correctly at the second terminal, and when the codewords of the second information corresponding to the N terminals are regarded as noise, the first information corresponding to the $n^{th}$ terminal can be decoded correctly at any terminal of (N−1) terminals, other than the second terminal, of the N terminals; and wherein the second condition met by the transmit rate for the codeword of the second information corresponding to the $r^{th}$ terminal comprises:
a transmit rate for a codeword of second information corresponding to the second terminal of the N terminals meets a fifth condition, and a transmit rate for a codeword of second information corresponding to an $s^{th}$ terminal of the other (N−1) terminals than the second terminal of the N terminals meets a sixth condition;

wherein the fifth condition comprises: when codewords of second information corresponding to the other (N−1) terminals than the second terminal of the N terminals and the codeword of the second information corresponding to the fourth terminal are regarded as noise, the second information corresponding to the second terminal can be decoded correctly at the second terminal; and wherein the sixth condition comprises: when codewords of second information corresponding to the (N−1) terminals, other than the $s^{th}$ terminal, of the N terminals is regarded as noise, the second information corresponding to the $s^{th}$ terminal can be decoded correctly at the $s^{th}$ terminal.

3. A downlink multiple access (MA) method, comprising:
when there is interference from a first base station in a neighboring cell, transmitting, by a second base station, a superposition of a codeword of first information and a codeword of second information to a fourth terminal and a second terminal, wherein the first information and the second information correspond to the fourth terminal, the fourth terminal is an interference-aligned user terminal, and the second terminal is an edge user terminal served by the first base station;

wherein the codeword of the first information corresponding to the fourth terminal is obtained according to a transmit rate and a transmit power for the codeword of the first information corresponding to the fourth terminal, the codeword of the second information corresponding to the fourth terminal is obtained according to a transmit rate and a transmit power for the codeword of the second information corresponding to the fourth terminal, the transmit rate for the codeword of the first information corresponding to the fourth terminal meets a first condition, and a transmit rate for the second information corresponding to the fourth terminal meets a second condition, wherein the first condition is: when codewords of first information corresponding to (N−1) terminals, other than a third terminal, of N terminals served by the first base station, codewords of second information corresponding to the N terminals, and the codeword of the second information corresponding to the fourth terminal are regarded as noise, a superposition of a codeword of first information corresponding to the third terminal and the codeword of the first information corresponding to the fourth terminal can be decoded correctly at a second terminal of the N terminals, and when the codeword of the second information corresponding to the fourth terminal is regarded as noise, the first information corresponding to the fourth terminal can be decoded correctly at the fourth terminal; the second condition is that correct decoding can be performed at the fourth terminal; and the third terminal is an interference-aligned user terminal; wherein the first information is information used by all terminals capable of receiving the first information, to perform joint detection, and the second information is information used by the terminal to perform single-user detection.

4. The method according to claim 3, wherein the superposition of the codeword of first information corresponding to the third terminal and the codeword of the first information corresponding to the fourth terminal being decoded correctly at the second terminal of the N terminals comprises:
smallest Euclidean distances $d_1$ and $d_2$ between constellation points in a constellation diagram being used by a coding and modulating scheme (CMS) that corresponds to the codeword of the first information corresponding to the third terminal and the codeword of the first information corresponding to the fourth terminal meet the following conditions respectively:

$$d_1 \geq 2 \frac{\sqrt{N_0 + |h_{k1}|^2 \sum_{j \neq t} P_{jc} + |h_{k1}|^2 \sum_{j=1}^{N} P_{jp} + |h_{k2}|^2 P_p}}{|h_{k1}|}, \text{ and}$$

$$d_2 \geq 2 \frac{\sqrt{N_0 + |h_{k1}|^2 \sum_{j \neq t} P_{jc} + |h_{k1}|^2 \sum_{j=1}^{N} P_{jp} + |h_{k2}|^2 P_p}}{|h_{k2}|};$$

and
wherein any constellation points $c_{kc}$ and $c_{tc}$ in the constellation diagram meet the following conditions: $h_{k1}c_{kc} \in \{Am : m \in Z^{2 \times 1}\}$ and $h_{k2}c_{tc} \in \{Am : m \in Z^{2 \times 1}\}$, wherein a channel fading factor for a terminal corresponds to the constellation point, $A \in C^{1 \times 2}$; and
wherein A is a preset two-dimensional complex number vector, $Z^{2 \times 1}$ represents an integer column vector with two rows and one column; $N_0$ represents a local noise power, $h_{k1}$ represents a channel fading factor between the second terminal and the first base station, $P_{jc}$ represents the transmit power for the codeword of the first information corresponding to the $j^{th}$ terminal, $P_{jp}$ represents the transmit power for the codeword of the second information corresponding to the $j^{th}$ terminal of the N terminals served by the first base station, and $h_{k2}$ represents a channel fading factor between the fourth terminal and the second base station.

5. A downlink multiple access (MA) method, applied to a cellular communications system, wherein channels between M first terminals and a first base station that are in the cellular communications system belong to a first channel, a channel between a second terminal and the first base station belongs to a second channel, and a channel fading factor of the first channel is greater than a channel fading factor of the second channel, wherein M≥1, M is an integer, and wherein the method comprises:

obtaining, by a fifth terminal, a first received signal, wherein the fifth terminal is any terminal of the M first terminals or the second terminal;

determining, by the fifth terminal according to the first received signal and with reference to a preconfigured first receiving policy, first information and second information that correspond to the fifth terminal, wherein the first receiving policy allows both the first information and the second information that correspond to the fifth terminal to be decoded correctly;

after the fifth terminal obtains the first received signal, detecting, by the fifth terminal according to the first received signal, first information corresponding to the M first terminals;

obtaining a second signal according to the first received signal and the first information corresponding to the M first terminals;

detecting, according to the second signal, first information corresponding to the second terminal;

obtaining a third signal according to the second signal and the first information corresponding to the second terminal; and detecting, according to the third signal, the second information corresponding to the fifth terminal.

6. A fifth terminal, applied to the cellular communications system, wherein channels between the M first terminals and the first base station that are in the cellular communications system belong to the first channel, the channel between the second terminal and the first base station belongs to the second channel, and the channel fading factor of the first channel is greater than the channel fading factor of the second channel, wherein M≥1, and M is an integer; the fifth terminal is any terminal of the M first terminals or the second terminal;

wherein the fifth terminal comprises a processor, a transceiver, a memory, and a communications bus;

wherein the communications bus is configured to implement a connection and communication between the processor, the transceiver, and the memory;

wherein the transceiver is configured to perform communication between the fifth terminal and the outside; and wherein the processor is configured to invoke program code stored in the memory to execute the method according to claim 5.

7. A first base station, comprising:

a transmitter; and a processor;

wherein the transmitter is configured to transmit a superposition of a codeword of first information and a codeword of second information to N terminals, wherein the first information and the second information correspond to each terminal of the N terminals, and N is a positive integer; and wherein a codeword of first information corresponding to an $r^{th}$ terminal is obtained by the processor according to a transmit rate and a transmit power for the codeword of the first information corresponding to the $r^{th}$ terminal, a codeword of second information corresponding to the $r^{th}$ terminal is obtained by the processor according to a transmit rate and a transmit power for the codeword of the second information corresponding to the $r^{th}$ terminal, the transmit rate for the codeword of the first information corresponding to the $r^{th}$ terminal meets a first condition, and the transmit rate for the codeword of the second information corresponding to the $r^{th}$ terminal meets a second condition, wherein the first condition comprises: when codewords of second information corresponding to the N terminals are regarded as noise, the first information corresponding to the $r^{th}$ terminal can be decoded correctly at any terminal of the N terminals, the second condition comprises: when codewords of second information corresponding to the other (N−1) terminals are regarded as noise, the second information corresponding to the $r^{th}$ terminal can be decoded correctly at the $r^{th}$ terminal, and 1≤r≤N; and wherein the first information is used by all terminals capable of receiving the first information, to perform joint detection, and the second information is used by the terminal to perform single-user detection.

8. The first base station according to claim 7, wherein there is interference from a second base station in a neighboring cell, and the first condition met by the transmit rate for the codeword of the first information corresponding to the $r^{th}$ terminal comprises:

a transmit rate for a codeword of first information corresponding to a third terminal of the N terminals meeting a third condition, and a transmit rate for a codeword of first information corresponding to the $n^{th}$ terminal of (N−1) terminals, other than the third terminal, of the N terminals meeting a fourth condition;

wherein the third condition comprises: when codewords of first information corresponding to the (N−1) terminals, other than the third terminal, of the N terminals, the codewords of the second information corresponding to the N terminals, and a codeword of second information corresponding to a fourth terminal served by the second base station are regarded as noise, a superposition of the codeword of the first information corresponding to the third terminal and a codeword of first information corresponding to the fourth terminal can be decoded correctly at a second terminal of the N terminals, wherein the second terminal is an edge user terminal served by the first base station, and the third terminal and the fourth terminal are interference-aligned user terminals; and wherein the fourth condition is: when the codewords of the second information corresponding to the N terminals and the codeword of the second information corresponding to the fourth terminal are regarded as noise, the first information corresponding to the $n^{th}$ terminal can be decoded correctly at the second terminal, and when the codewords of the second information corresponding to the N terminals are regarded as noise, the first information corresponding to the $n^{th}$ terminal can be decoded correctly at any terminal of (N−1) terminals, other than the second terminal, of the N terminals;

wherein the second condition met by the transmit rate for the codeword of the second information corresponding to the $r^{th}$ terminal comprises:

a transmit rate for a codeword of second information corresponding to the second terminal of the N terminals meets a fifth condition, and a transmit rate for a codeword of second information corresponding to an $s^{th}$ terminal of the other (N−1) terminals than the second terminal of the N terminals meets a sixth condition;

wherein the fifth condition comprises: when codewords of second information corresponding to the other (N−1) terminals than the second terminal of the N terminals and the codeword of the second information corresponding to the fourth terminal are regarded as noise, the second information corresponding to the second terminal can be decoded correctly at the second terminal; and wherein the sixth condition comprises: when codewords of second information corresponding to the (N−1) terminals, other than the $s^{th}$ terminal, of the N terminals is regarded as noise, the second information corresponding to the $s^{th}$ terminal can be decoded correctly at the $s^{th}$ terminal.

9. A second base station, comprising:
a transmitter; and
a processor;
wherein the transmitter is configured to: when there is interference from a first base station in a neighboring cell, transmit a superposition of a codeword of first information and a codeword of second information to a fourth terminal and a second terminal, wherein the first information and the second information correspond to the fourth terminal, the fourth terminal is an interference-aligned user terminal, and the second terminal is an edge user terminal served by the first base station;

wherein the codeword of the first information corresponding to the fourth terminal is obtained by the processor according to a transmit rate and a transmit power for the codeword of the first information corresponding to the fourth terminal, the codeword of the second information corresponding to the fourth terminal is obtained by the processor according to a transmit rate and a transmit power for the codeword of the second information corresponding to the fourth terminal, the transmit rate for the codeword of the first information corresponding to the fourth terminal meets a first condition, and a transmit rate for the second information corresponding to the fourth terminal meets a second condition, wherein the first condition is: when codewords of first information corresponding to (N−1) terminals, other than a third terminal, of N terminals served by the first base station, codewords of second information corresponding to the N terminals, and the codeword of the second information corresponding to the fourth terminal are regarded as noise, a superposition of a codeword of first information corresponding to the third terminal and the codeword of the first information corresponding to the fourth terminal can be decoded correctly at a second terminal of the N terminals, and when the codeword of the second information corresponding to the fourth terminal is regarded as noise, the first information corresponding to the fourth terminal can be decoded correctly at the fourth terminal; the second condition is that correct decoding can be performed at the fourth terminal; and the third terminal is an interference-aligned user terminal; and wherein the first information is used by all terminals capable of receiving the first information, to perform joint detection, and the second information is information used by the terminal to perform single-user detection.

10. The second base station according to claim 9, wherein the superposition of the codeword of first information corresponding to the third terminal and the codeword of the first information corresponding to the fourth terminal being decoded correctly at the second terminal of the N terminals comprises:

smallest Euclidean distances $d_1$ and $d_2$ between constellation points in a constellation diagram used by a coding and modulating scheme (CMS) that corresponds to the codeword of the first information corresponding to the third terminal and the codeword of the first information corresponding to the fourth terminal meeting the following conditions respectively:

$$d_1 \geq 2 \frac{\sqrt{N_0 + |h_{k1}|^2 \sum_{j \neq t} P_{jc} + |h_{k1}|^2 \sum_{j=1}^{N} P_{jp} + |h_{k2}|^2 P_p'}}{|h_{k1}|}, \text{ and}$$

$$d_2 \geq 2 \frac{\sqrt{N_0 + |h_{k1}|^2 \sum_{j \neq t} P_{jc} + |h_{k1}|^2 \sum_{j=1}^{N} P_{jp} + |h_{k2}|^2 P_p'}}{|h_{k2}|};$$

and wherein any constellation points $c_{kc}$ and $c_{tc}$ in the constellation diagram meet the following conditions: $h_{k1} c_{kc} \in \{Am : m \in Z^{\times 1}\}$ and $h_{k2} c_{tc} \in \{Am : m \in Z^{2 \times 1}\}$;

wherein a channel fading factor for a terminal corresponds to the constellation point, $A \in C^{1 \times 2}$, A is a preset two-dimensional complex number vector, $Z^{2 \times 1}$ represents an integer column vector with two rows and one column, $N_0$ represents a local noise power, $h_{k1}$ represents a channel fading factor between the second terminal and the first base station, $P_{jc}$ represents the transmit power for the codeword of the first information corresponding to the $j^{th}$ terminal, $P_{jp}$ represents the transmit power for the codeword of the second information corresponding to the $j^{th}$ terminal of the N terminals served by the first base station, and $h_{k2}$ represents a channel fading factor between the fourth terminal and the second base station.

* * * * *

UNITED STATES PATENT AND TRADEMARK OFFICE
CERTIFICATE OF CORRECTION

PATENT NO. : 10,205,555 B2  
APPLICATION NO. : 15/377062  
DATED : February 12, 2019  
INVENTOR(S) : Wang Page 1 of 1

It is certified that error appears in the above-identified patent and that said Letters Patent is hereby corrected as shown below:

In the Claims

In Column 66, Claim 10, delete Line 38 and insert -- $h_{k1}c_{kc} \in \{Am : m \in Z^{2\times 1}\}$ and $h_{k2}c_{tc} \in \{Am : m \in Z^{2\times 1}\}$ ;--.

Signed and Sealed this  
Twenty-sixth Day of March, 2019

Andrei Iancu  
*Director of the United States Patent and Trademark Office*